United States Patent
Yoshioka

(10) Patent No.: US 12,176,154 B2
(45) Date of Patent: Dec. 24, 2024

(54) MULTILAYER CERAMIC CAPACITOR

(71) Applicant: Murata Manufacturing Co., Ltd., Nagaokakyo (JP)

(72) Inventor: Hiroyuki Yoshioka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 176 days.

(21) Appl. No.: 18/097,630

(22) Filed: Jan. 17, 2023

(65) Prior Publication Data
US 2023/0230773 A1 Jul. 20, 2023

(30) Foreign Application Priority Data

Jan. 19, 2022 (JP) .................... 2022-006613

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *H01G 4/012* (2013.01); *H01G 4/1227* (2013.01); *H01G 4/008* (2013.01)

(58) Field of Classification Search
CPC ............ H01G 4/30; H01G 4/32; H01G 4/012; H01G 4/1227; H01G 4/008
See application file for complete search history.

(56) References Cited

U.S. PATENT DOCUMENTS

| | | | | |
|---|---|---|---|---|
| 2014/0301015 | A1* | 10/2014 | Kim | H01G 4/12 29/25.03 |
| 2015/0348712 | A1* | 12/2015 | Lee | H01G 4/30 156/89.12 |
| 2016/0196918 | A1* | 7/2016 | Hong | H01G 4/232 361/301.4 |
| 2017/0018363 | A1* | 1/2017 | Tanaka | H01G 4/30 |
| 2018/0182555 | A1* | 6/2018 | Kowase | H01G 4/30 |
| 2020/0098519 | A1* | 3/2020 | Kusumoto | H01G 4/232 |
| 2023/0290577 | A1* | 9/2023 | Tsushima | H01G 4/1218 |

FOREIGN PATENT DOCUMENTS

JP 8-306580 A 11/1996

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers laminated on each other, inner electrode layers laminated on the dielectric layers, first and second main surfaces, first and second end surfaces, and first and second lateral surfaces, first and second external electrodes on the first and second end surfaces, an inner layer portion in which the inner electrode layers are opposed to each other, outer layer portions on first and second main surface sides and first and second lateral surface sides. Voids are provided in the outer layer portions on the first and second lateral surface sides. A ratio of a total area of the voids relative to an area of the outer layer portion on the first or second lateral surface side in a cross section of the multilayer body is greater than or equal to about 0.02% and less than or equal to about 0.2%.

17 Claims, 11 Drawing Sheets

II-II CROSS SECTION

IVa-IVa CROSS SECTION

IVb-IVb CROSS SECTION

IX-IX CROSS SECTION

XI-XI CROSS SECTION

MULTILAYER CERAMIC CAPACITOR

CROSS REFERENCE TO RELATED APPLICATIONS

This application claims the benefit of priority to Japanese Patent Application No. 2022-006613 filed on Jan. 19, 2022. The entire contents of this application are hereby incorporated herein by reference.

BACKGROUND OF THE INVENTION

1. Field of the Invention

The present disclosure relates to a multilayer ceramic capacitor.

2. Description of the Related Art

In recent years, a large number of multilayer ceramic capacitors, which are ceramic-made chip electronic components, are often used in electronic devices. The electronic devices using the multilayer ceramic capacitors are increasingly improved in performance. Such high-performance electronic devices are accelerating the technological advancement in the multilayer ceramic capacitors as well, for example, miniaturization and higher capacities of the capacitors. Japanese Patent Laid-Open No. H08-306580, for example, describes an example of the multilayer ceramic capacitors.

Based on these backgrounds, ferroelectric materials typically relatively high in permittivity, for example, barium titanate, are more often used in the chip electronic parts like the multilayer ceramic capacitors.

For instance, a voltage is applied to a multilayer ceramic capacitor with a multilayer body made from such a ferroelectric material. Then, the dielectric material may generate a phenomenon called electrostriction, causing the multilayer body to distort to an extent that corresponds to the magnitude of the applied voltage. This distortion occurs in a direction of electric field and in a direction perpendicular to the direction of electric field, leading to mechanical displacement. The electrostriction may generate a stress inside of the multilayer ceramic capacitor.

In the multilayer ceramic capacitor, this electrostriction-induced stress may be generated between an effective layer portion deformable under the impact of an electric field (inner layer portion) and an outer peripheral portion solely consisting of a dielectric layer unaffected by any electric field. The outer peripheral portion includes a first outer layer portion disposed between a first main surface of a multilayer body and the inner electrode layer most proximate to the first main surface (outer layer portion on first main surface side) of an effective layer portion (inner layer portion in which inner electrode layers are opposed to each other), a second outer layer portion disposed between a second main surface of the multilayer body and the inner electrode layer most proximate to the second main surface (outer layer portion on second main surface side), a first lateral portion disposed between a first lateral surface and the effective layer portion (inner layer portion) (outer layer portion on first lateral surface side), and a second lateral portion disposed between a second lateral surface and the effective layer portion (inner layer portion) (outer layer portion on second lateral surface side).

In regard to these layer portions, there is a possible risk of tensile stress and resulting cracks between the effective layer portion (inner layer portion) deformable under the impact of electric field and the portions unaffected by electric field including a first lateral portion (outer layer portion on first lateral surface side) and a second lateral portion (outer layer portion on second lateral surface side).

SUMMARY OF THE INVENTION

Preferred embodiments of the present invention provide multilayer ceramic capacitors that are each able to avoid a risk of cracks between an effective layer portion deformable due to an electric field (inner layer portion) and layer portions unaffected by electric field including an outer layer portion on a first lateral surface side and an outer layer portion on a second lateral surface side.

A multilayer ceramic capacitor according to a preferred embodiment of the present invention includes a multilayer body including a plurality of dielectric layers laminated on each other, a plurality of inner electrode layers laminated on the plurality of dielectric layers, a first main surface and a second main surface opposed to each other in a direction of layer lamination, a first end surface and a second end surface opposed to each other in a direction of length orthogonal or substantially orthogonal to the direction of layer lamination, and a first lateral surface and a second lateral surface opposed to each other in a direction of width orthogonal or substantially orthogonal to the direction of layer lamination and the direction of length. The multilayer ceramic capacitor further includes a first external electrode on the first end surface, and a second external electrode on the second end surface. The multilayer body further includes an inner layer portion in which a plurality of inner electrode layers are opposed to each other, an outer layer portion on a first main surface side on a side closer to the first main surface and including the plurality of dielectric layers at the first main surface, a first outermost surface of the inner layer portion on the side closer to the first main surface and a line of extension from the first outermost surface, an outer layer portion on a second main surface side on a side closer to the second main surface and including the plurality of dielectric layers at the second main surface, a second outermost surface of the inner layer portion on the side closer to the second main surface and a line of extension from the second outermost surface, an outer layer portion on a first lateral surface side on a side closer to the first lateral surface and including the plurality of dielectric layers between the first lateral surface and an outermost surface of the inner layer portion on the side closer to the first lateral surface, and an outer layer portion on a second lateral surface side on a side closer to the second lateral surface and including the plurality of dielectric layers between the second lateral surface and an outermost surface of the inner layer portion on the side closer to the second lateral surface, wherein a ratio of a length G of the outer layer portion on the first main surface side or the outer layer portion on the second main surface side in the direction of layer lamination relative to a length T in the direction of layer lamination that connects the first main surface and the second main surface of the multilayer body is greater than or equal to about 0.04 and less than or equal to about 0.10, a ratio of a width g of the outer layer portion on the first lateral surface side or the outer layer portion on the second lateral surface side in the direction of width relative to a width W in the direction of width that connects the first lateral surface and the second lateral surface of the multilayer body is greater than or equal to about 0.02 and less than or equal to about 0.05, a plurality of first voids are provided in the outer layer portion on the first lateral surface side and in the outer layer portion on the second lateral surface side, and a ratio A of a total area of the plurality of first voids in the outer layer portion on the first lateral surface side or in the outer layer portion on the second lateral surface side relative to an area of the outer layer portion on the first lateral surface side or the outer layer portion on the second lateral surface side in a cross section of the multilayer body is greater than or equal to about 0.02% and less than or equal to about 0.2%.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

First Preferred Embodiment 1-1. Multilayer Ceramic Capacitor

Figure 1:
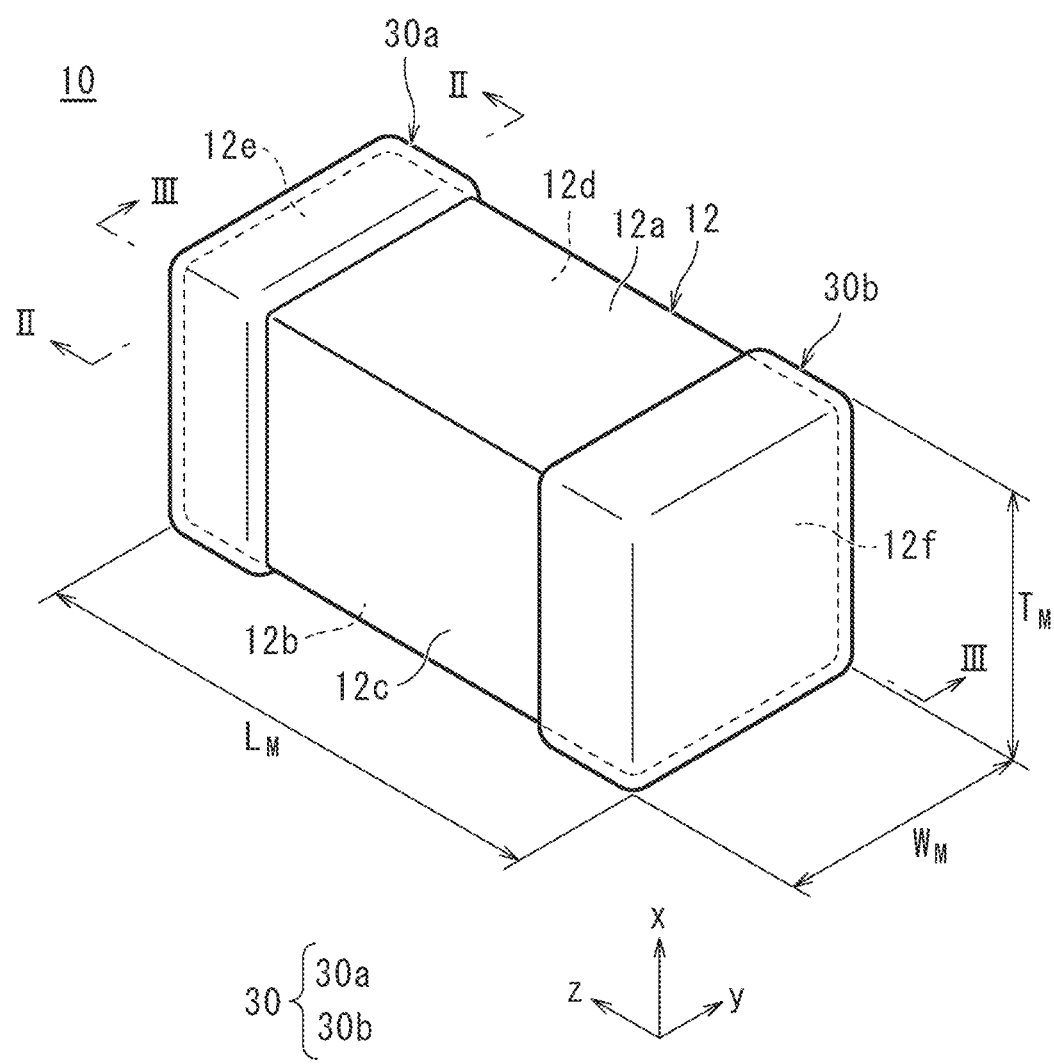
FIG. 1 is a perspective view of an exemplified multilayer ceramic capacitor according to a first preferred embodiment of the present invention.
Figure 2:
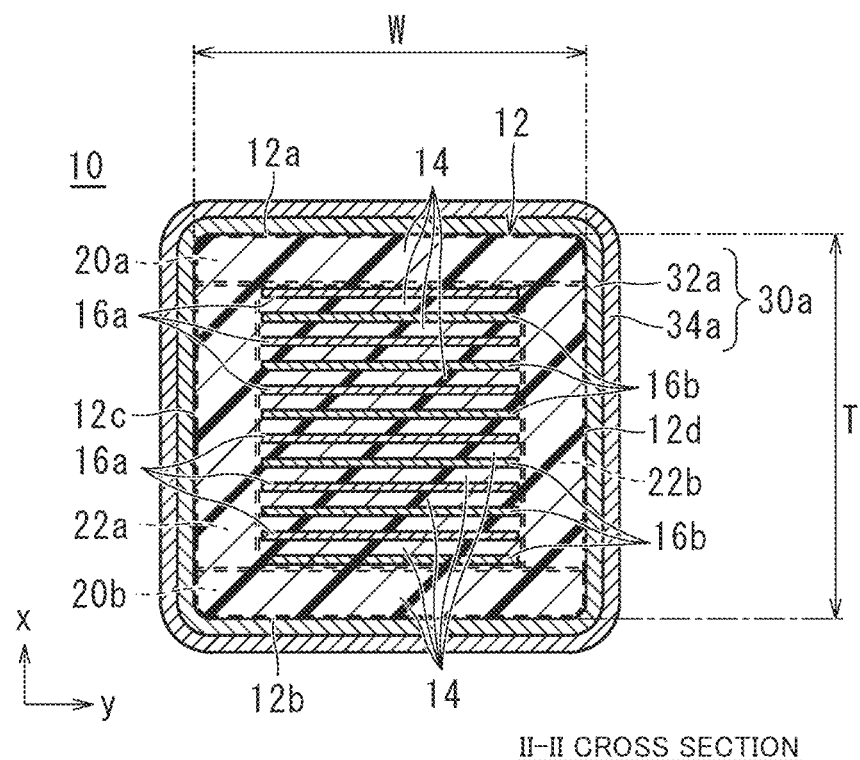
FIG. 2 is a view in a cross section of FIG. 1 along Line II-II.
Figure 3:
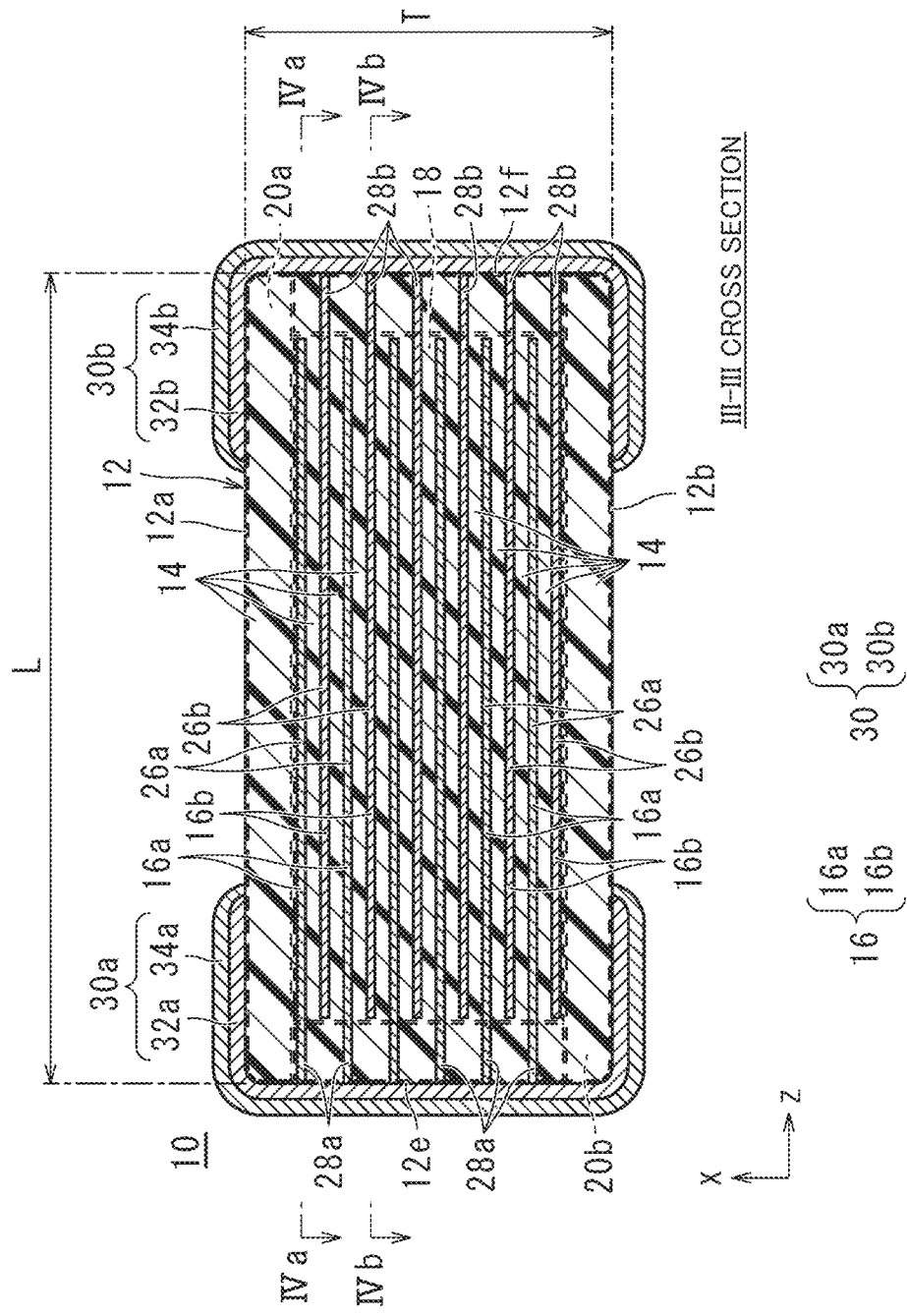
FIG. 3 is a view in a cross section of FIG. 1 along Line III-III.
Figure 4A:
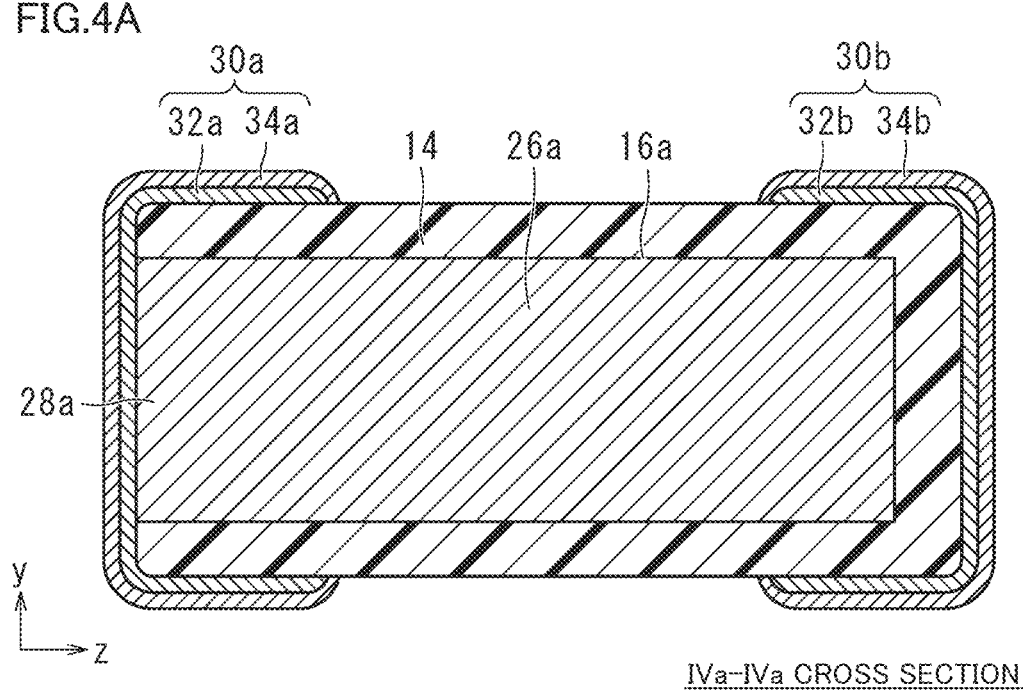
FIG. 4A is a view in a cross section of FIG. 3 along Line IVa-IVa.
Figure 4B:
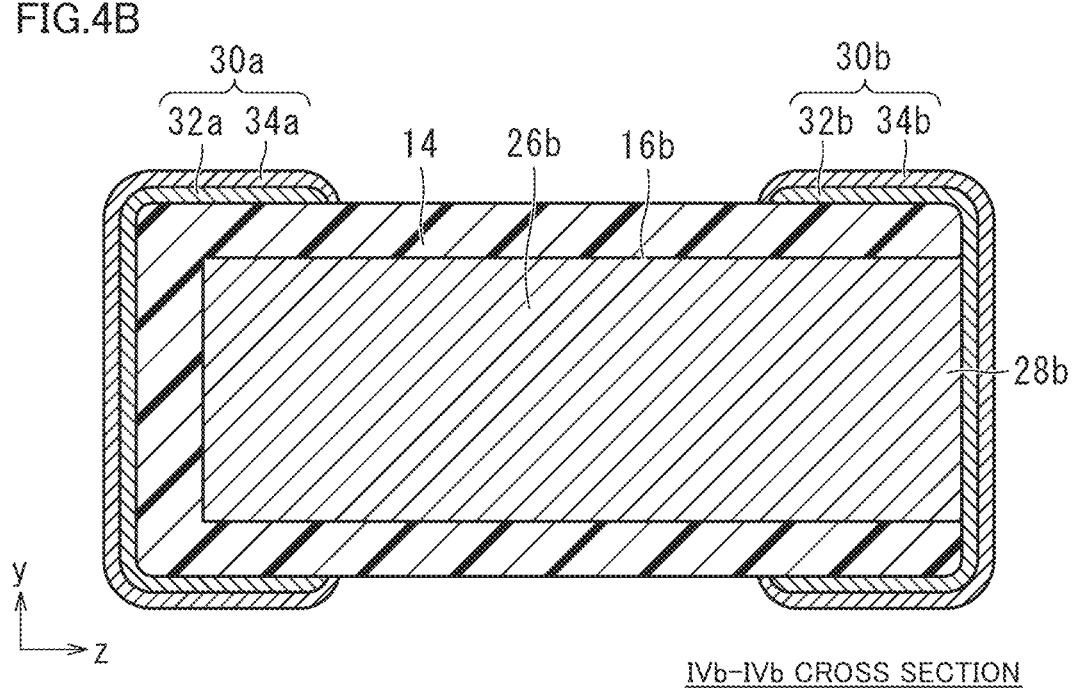
FIG. 4B is a view in a cross section of FIG. 3 along Line IVb-IVb.
Figure 5A:
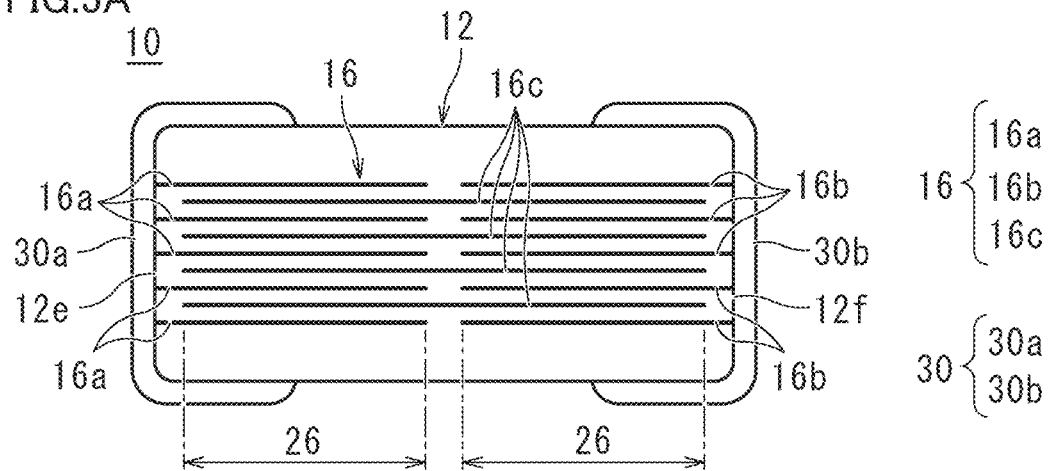
FIG. 5A is a view in a cross section of FIG. 1 along Line illustrating a structure in which electrodes opposed to each other of an inner electrode layer have been divided into two sections in the multilayer ceramic capacitor according to the first preferred embodiment of the present invention.
Figure 5B:
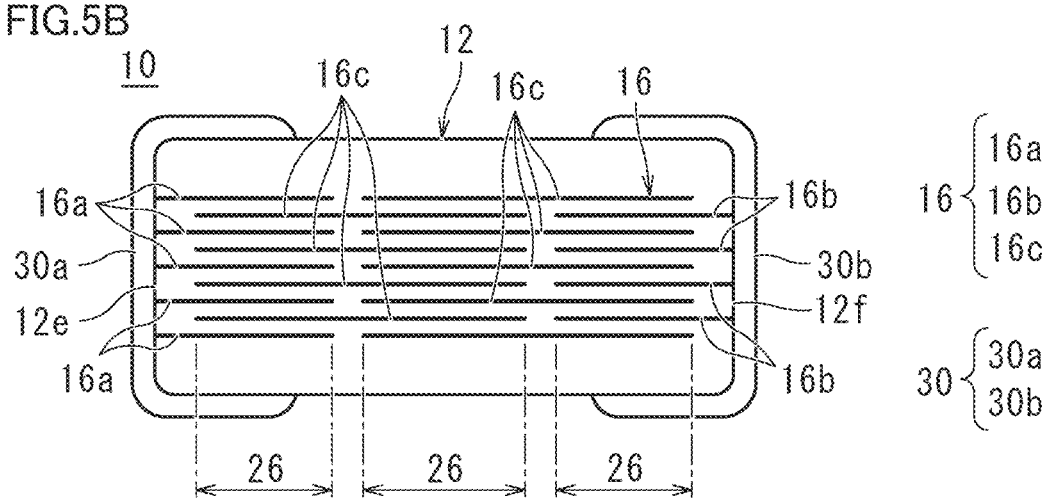
FIG. 5B is a view in a cross section of FIG. 1 along Line illustrating a structure in which opposed to each other of the inner electrode layer have been divided into three sections in the multilayer ceramic capacitor according to the first preferred embodiment of the present invention.
Figure 5C:
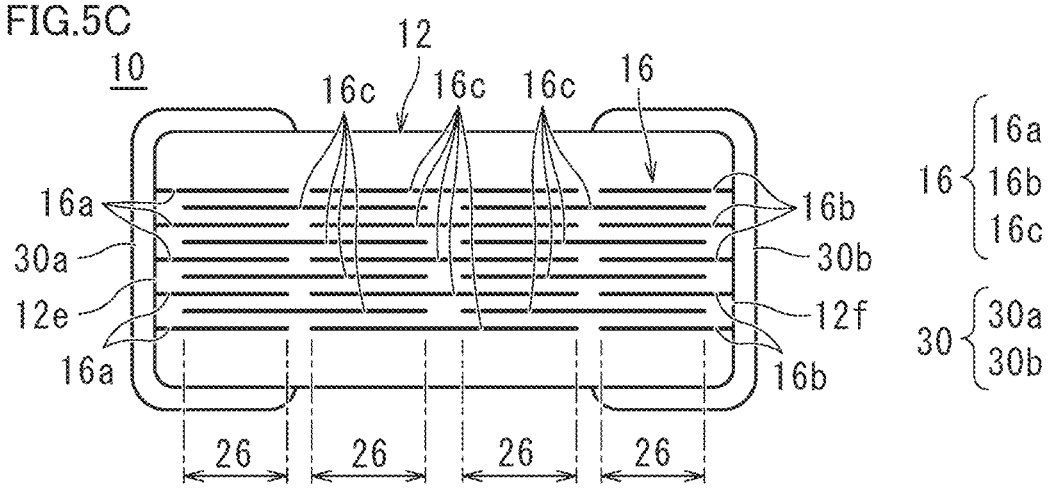
FIG. 5C is a view in a cross section of FIG. 1 along Line III-III, illustrating a structure in which electrodes opposed to each other of the inner electrode layer have been divided into four sections in the multilayer ceramic capacitor according to the first preferred embodiment of the present invention.
Figure 6:
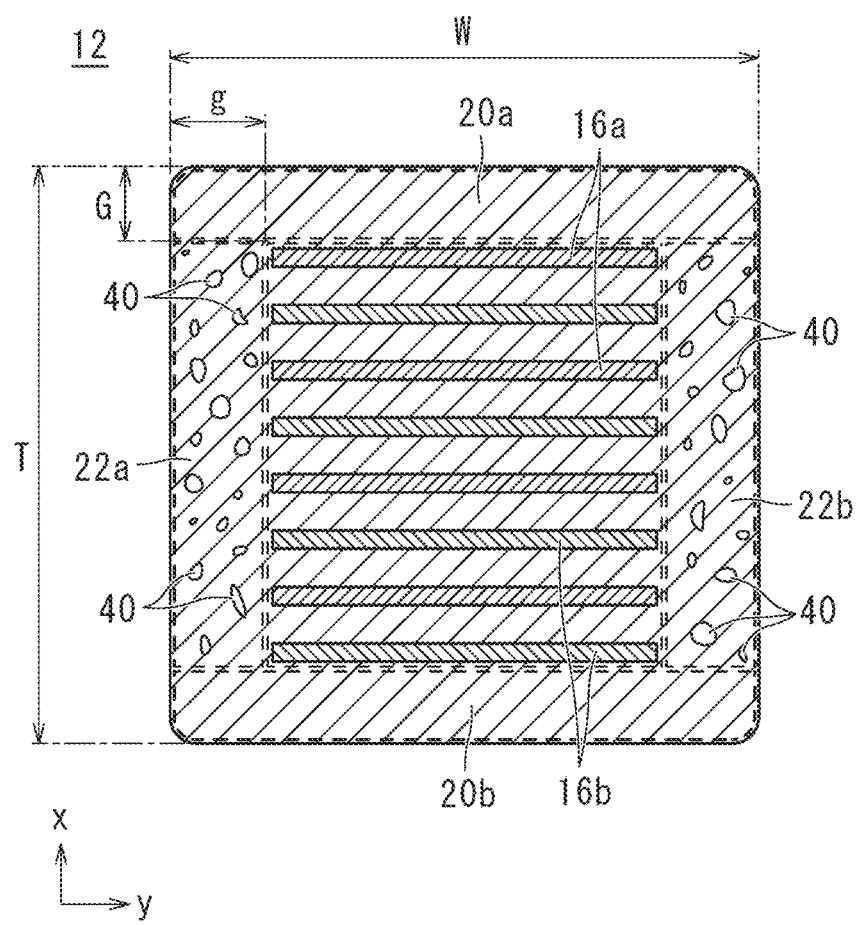
FIG. 6 is a schematic view of a multilayer body in WT cross section according to the first preferred embodiment of the present invention.
Figure 7:
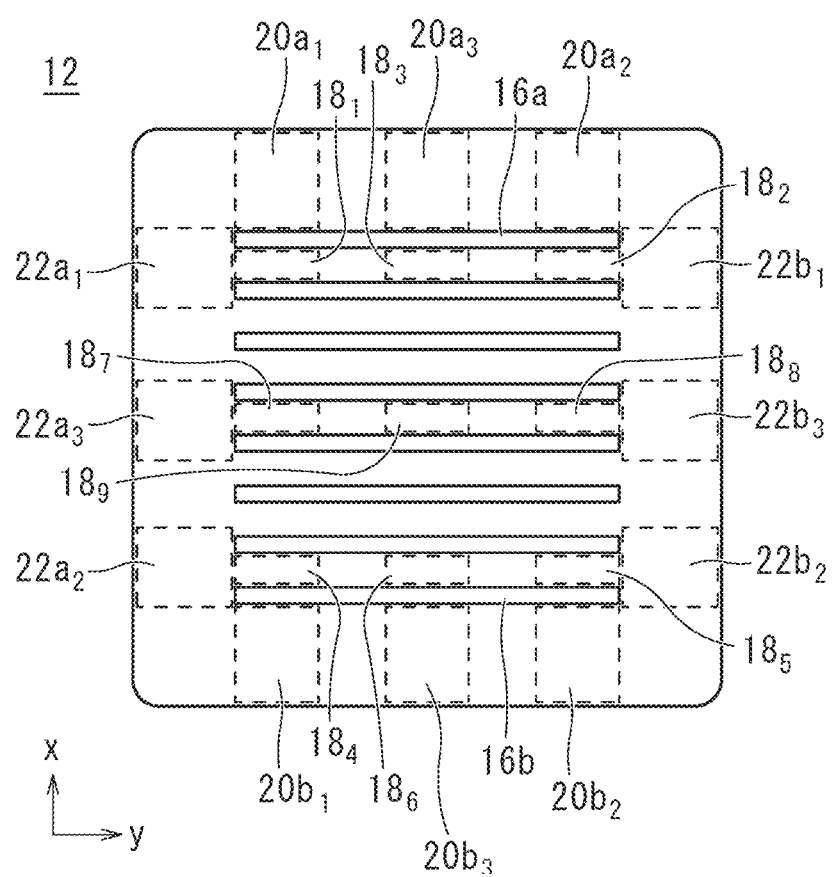
FIG. 7 is a drawing that illustrates points to be measured of the multilayer body according to the first preferred embodiment of the present invention.

A multilayer ceramic capacitor 10 according to a first preferred embodiment of the present invention is hereinafter described with reference to FIGS. 1 to 7. FIG. 1 is a perspective view of an example of the multilayer ceramic capacitor according to the first preferred embodiment. FIG. 2 is a view in a cross section of FIG. 1 along Line II-II. FIG. 3 is a view in a cross section of FIG. 1 along Line III-III. FIG. 4A is a view in a cross section of FIG. 3 along Line IVa-IVa. FIG. 4B is a view in a cross section of FIG. 3 along Line IVb-IVb. FIG. 5A is a view in a cross section of FIG. 1 along Line III-III, illustrating a structure in which electrodes opposed to each other of inner electrode layers have been divided into two sections in the multilayer ceramic capacitor according to the first preferred embodiment. FIG. 5B is a view in a cross section of FIG. 1 along Line III-III, illustrating a structure in which electrodes opposed to each other of the inner electrode layers have been divided into three sections in the multilayer ceramic capacitor according to the first preferred embodiment. FIG. 5C is a view in a cross section of FIG. 1 along Line III-III, illustrating a structure in which electrodes opposed to each other of the inner electrode layers have been divided into four sections in the multilayer ceramic capacitor according to the first preferred embodiment. FIG. 6 is a schematic view of the multilayer body in WT cross section according to the first preferred embodiment. FIG. 7 is a drawing that illustrates points to be measured of the multilayer body according to the first preferred embodiment.

Multilayer Body

A multilayer body 12 includes a plurality of laminated dielectric layers 14 and a plurality of inner electrode layers 16 laminated on the dielectric layers 14. Multilayer body 12 includes a first main surface 12a and a second main surface 12b that are opposed to each other in a direction of layer lamination x, a first end surface 12e and a second end surface 12f that are opposed to each other in a direction of length z orthogonal or substantially orthogonal to direction of layer lamination x and a first lateral surface 12c and a second lateral surface 12d that are opposed to each other in a direction of width y orthogonal or substantially orthogonal to direction of length z and direction of layer lamination x.

Multilayer body 12 has a shape of rectangular or substantially rectangular solid. The angular portions and ridge portions of multilayer body 12 may preferably be rounded. The angular portion refers to a portion at which adjacent three surfaces of multilayer body 12 intersect with one another. The ridge portion refers to a portion at which adjacent two surfaces of multilayer body 12 intersect with each other. Multilayer body 12 may have irregularities in a portion or in an entirety of the respective surfaces, including first main surface 12a and second main surface 12b, first lateral surface 12c and second lateral surface 12d, and first end surface 12e and second end surface 12f.

The dimensions of multilayer body 12 are not particularly limited. Multilayer body 12 has a dimension of L in direction of length z. Multilayer body 12 has a dimension of W in direction of width y. Multilayer body 12 has a dimension of T in direction of layer lamination x.

Dielectric Layer

The ceramic material used for dielectric layer 14 may be selected from dielectric ceramic materials primarily consisting of, for example, $BaTiO_3$, $CaTiO_3$, $SrTiO_3$, or $CaZrO_3$. The ceramic material may further include, in addition to the main ingredient described above, an accessory ingredient, examples of which include an Mn compound(s), an Fe compound(s), a Cr compound(s), a Co compound(s) and an Ni compound(s). Dielectric layer 14 may preferably have a thickness greater than or equal to about 0.5 μm and less than or equal to about 10 μm, for example. The number of dielectric layers 14 may preferably be, for example, greater than or equal to 10 layers and less than or equal to 700 layers, including an outer layer portion 20a on first main surface side and an outer layer portion 20b on second main surface side described later.

Inner Electrode Layer

Inner electrode layers 16 include a plurality of first inner electrode layers 16a and a plurality of second inner electrode layers 16b.

First inner electrode layers 16a are disposed on dielectric layers 14 and exposed on first end surface 12e.

Second inner electrode layers 16b are each disposed on dielectric layer 14 and exposed on second end surface 12f.

First inner electrode layers 16a each include a first opposed electrode portion 26a and a first extraction electrode portion 28a. First opposed electrode portion 26a is opposed to second inner electrode layer 16b. First extraction electrode portion 28a extends, from first opposed electrode portion 26a, onto first end surface 12e of multilayer body 12. In first extraction electrode portion 28a of first inner electrode layer 16a, an end portion of the electrode portion 28a extends as far as first end surface 12e of multilayer body 12, defining an exposed portion.

Second inner electrode layers 16b each include a second opposed electrode portion 26b and a second extraction electrode portion 28b. Second opposed electrode portion 26b is opposed to first inner electrode layer 16a. Second extraction electrode portion 28b extends, from second opposed electrode portion 26b, onto second end surface 12f of multilayer body 12. In second extraction electrode portion 28b of second inner electrode layer 16b, an end portion of this electrode portion 28b extends as far as second end surface 12f of multilayer body 12, defining an exposed portion.

First opposed electrode portion 26a of first inner electrode layer 16a and second opposed electrode portion 26b of second inner electrode layer 16b, although their shapes are not particularly limited, may preferably have, for example, a rectangular or substantially rectangular shape. The rectangular or substantially rectangular shape may include rounded corners rounded or oblique corners.

First extraction electrode portion 28a of first inner electrode layer 16a and second extraction electrode portion 28b of second inner electrode layer 16b, although their shapes are not particularly limited, may preferably have, for example, a rectangular or substantially rectangular shape. The rectangular or substantially rectangular shape may include rounded corners rounded or obliquely formed corners.

First opposed electrode portion 26a of first inner electrode layer 16a and second opposed electrode portion 26b of second inner electrode layer 16b may have a width dimension, for example, equal or substantially equal to that of first extraction electrode portion 28a of first inner electrode layer 16a and second extraction electrode portion 28b of second inner electrode layer 16b. Otherwise, one of the widths may be greater or less than the other.

In the present preferred embodiment, electrode portions 26 of inner electrode layers 16 are opposed to each other with dielectric layer 14 interposed therebetween. This generates an electrostatic capacitance, for example, thus enabling the capacitor to have desired properties.

First inner electrode layer 16a and second inner electrode layer 16b may each include a floating inner electrode layer 16c which neither extends to first end surface 12e nor to second end surface 12f, so that opposed electrode portions 26 are divided into two or more rows by floating inner electrode layer 16c. For example, the opposed electrode portions may be divided in two, three, or four rows, as illustrated in FIGS. 5A to 5C. The opposed electrode portions are dividable in more than four rows. Such a plurality of rows of opposed electrode portions 26 define a plurality of capacitor elements between the opposed inner electrode layers that are connected in series to each other. This may enables a reduction of the voltage applied to each capacitor element, so as to provide to higher pressure tolerance of the multilayer ceramic capacitor.

First inner electrode layer 16a and second inner electrode layer 16b may be made from an electrically conductive material suitably selected from, for example, Ni, Cu, Ag, Pd, and Au and alloys including at least one of these metals such as Ag—Pd alloy.

For instance, Sn may be included in the interface between inner electrode layer 16 and dielectric layer 14. The Sn may be provided as a layer or may be scattered around. The Sn may be solidly soluble on a side closer to inner electrode layer 16 or may be solidly soluble with dielectric grains on a side closer to dielectric layer 14.

First inner electrode layer 16a and second inner electrode layer 16b may preferably have a thickness, for example, greater than or equal to about 0.2 μm and less than or equal to about 2.0 μm. The number of inner electrode layers 16 may preferably be, for example, greater than or equal to 10 layers and less than or equal to 700 layers.

Multilayer body 12 includes an inner layer portion 18 including inner electrode layers 16 that are opposed to each other. This may be rephrased that, in inner layer portion 18, first inner electrode layer 16a and second inner electrode layer 16b are facing each other.

Multilayer body 12 includes an outer layer portion 20a on first main surface side disposed on a side closer to first main surface 12a. Outer layer portion 20a on first main surface side includes a plurality of the dielectric layers 14 disposed among first main surface 12a, an outermost surface of inner layer portion 18 on the side closer to first main surface 12a and a line of extension from the outermost surface.

Multilayer body 12 further includes an outer layer portion 20b on second main surface side disposed on a side closer to second main surface 12b. Outer layer portion 20b on second main surface includes a plurality of the dielectric layers 14 disposed among second main surface 12b, an outermost surface of inner layer portion 18 on the side closer to second main surface 12b and a line of extension from the outermost surface.

Multilayer body 12 also includes an outer layer portion 22a on first lateral surface side disposed on a side closer to first lateral surface 12c. Outer layer portion 22a on first lateral surface side includes a plurality of the dielectric layers 14 among first lateral surface 12c, an outermost surface of inner layer portion 18 on the side closer to first lateral surface 12c and a line of extension from the outermost surface.

Similarly, multilayer body 12 includes an outer layer portion 22b on second lateral surface side disposed on a side closer to second lateral surface 12d. Outer layer portion 22b on second lateral surface side includes a plurality of the dielectric layers 14 disposed among second lateral surface 12d, an outermost surface of inner layer portion 18 on the side closer to second lateral surface 12d and a line of extension from the outermost surface.

In multilayer body 12, outer layer portion 20a on first main surface side or outer layer portion 20b on second main surface side has, for example, a length G in direction of layer lamination x.

Further, outer layer portion 22a on first lateral surface side or outer layer portion 22b on second lateral surface side in multilayer body 12 has, for example, a width g in direction of width y.

Supposing T is a length in direction of layer lamination x that connects first main surface 12a and second main surface 12b of multilayer body 12, the ratio of length G in direction of layer lamination x of outer layer portion 20a on first main surface side or outer layer portion 20b on second main surface side relative to length T is, for example, greater than or equal to about 0.04 and less than or equal to about 0.10. Then, an adequate thickness may be ensured for outer layer portion 20a on first main surface side or outer layer portion 20b on second main surface side that are connected to outer layer portion 22a on first lateral surface side and outer layer portion 22b on second lateral surface side. An inverse piezoelectric effect of dielectric layers 14 may be produced when an electric field is applied to multilayer ceramic capacitor 10, which possibly causes the elastic motion of inner layer portion 18. Such an outer layer portion with an adequate thickness, however, may provide an inverse piezoelectric-free area (i.e., outer layer portion 20a on first main surface side and outer layer portion 20b on second main surface side). This may reduce the risk of cracks induced by the possible elastic motion of inner layer portion 18 under the inverse piezoelectric effect of dielectric layers 14. Additionally, the range of values disclosed above may ensure a sufficient electrostatic capacitance of multilayer ceramic capacitor 10.

If the ratio of length G in direction of layer lamination x of outer layer portion 20a on first main surface side or outer layer portion 20b on second main surface side relative to length T that connects first main surface 12a and second main surface 12b of multilayer body 12 in direction of layer lamination x falls below about 0.04, outer layer portion 20a or 20b on first or second main surface side may be reduced in strength, undermining or losing the controllability of deformation of multilayer body 12. As a result, the risk of cracks may be poorly controlled.

If the ratio of length G in direction of layer lamination x of outer layer portion 20a on first main surface side or outer layer portion 20b on second main surface side relative to length T that connects first main surface 12a and second main surface 12b of multilayer body 12 in direction of layer lamination x exceeds about 0.10, dielectric layer 14 between first inner electrode layer 16a and second inner electrode layer 16b has a smaller area. As a result, a desired electrostatic capacitance may be difficult to obtain.

When W is a width in direction of width y that connects first lateral surface 12c and second lateral surface 12d of multilayer body 12, the ratio of width g in direction of width y of outer layer portion 22a on first lateral surface side or outer layer portion 22b on second lateral surface side relative to width W is, for example, greater than or equal to about 0.02 and less than or equal to about 0.05. Then, an adequate thickness may be ensured for outer layer portion 22a or 22b on first or second lateral surface side connected to outer layer portions 20a and 20b on first and second main surface sides. An inverse piezoelectric effect of dielectric layers 14 may be produced when an electric field is applied to multilayer ceramic capacitor 10, which possibly causes the elastic motion of inner layer portion 18. Such a thick outer layer portion, however, may provide an inverse piezoelectric-free area (i.e., outer layer portion 20a on first main surface side, outer layer portion 20b on second main surface side, outer layer portion 22a on first lateral surface side, and outer layer portion 22b on second lateral surface side). This may reduce the risk of cracks induced by the possible elastic motion of inner layer portion 18. Additionally, the range of values disclosed above may ensure a sufficient electrostatic capacitance of multilayer ceramic capacitor 10.

If the ratio of width g in direction of width y of outer layer portion 22a on first lateral surface side or outer layer portion 22b on second lateral surface side relative to width W that connects first lateral surface 12c and second lateral surface 12d of multilayer body 12 in direction of width y falls below about 0.02, the elastic motion of inner layer portion 18 may not be controlled as effectively as otherwise by outer layer portions 22a and 22b on first and second lateral surface sides. Thus, the degree of deformation of multilayer body 12 may be unfavorably increased, as a result of which the risk of cracks may fail to be effectively controlled.

If the ratio of width g in direction of width y of outer layer portion 22a on first lateral surface side or outer layer portion 22b on second lateral surface side relative to width W that connects first lateral surface 12c and second lateral surface 12d of multilayer body 12 in direction of width y exceeds about 0.05, dielectric layer 14 between first inner electrode layer 16a and second inner electrode layer 16b has a smaller area. As a result, a desired electrostatic capacitance may be difficult to obtain.

A plurality of first voids 40 are provided in outer layer portion 22a on first lateral surface side and outer layer portion 22b on second lateral surface side. A ratio A of the total area of first voids 40 in outer layer portion 22a on first lateral surface side or outer layer portion 22b on second lateral surface side relative to an area of outer layer portion 22a or 22b on first or second lateral surface side in a cross section of multilayer body 12 (WT cross section at ½L position) may be, for example, greater than or equal to about 0.02% and less than or equal to about 0.2%. This enables first voids 40 to effectively disperse any inverse piezoelectric-induced stress, while achieving, at the same time, a higher degree of density in outer layer portion 22a on first lateral surface side and outer layer portion 22b on second lateral surface side. As a result, outer layer portion 22a on first lateral surface side and outer layer portion 22b on second lateral surface side may both have improved strength. The inverse piezoelectric effect of dielectric layers 14 may be produced when an electric field is applied to multilayer ceramic capacitor 10. This may possibly cause the elastic motion of inner layer portion 18, increasing the risk of cracks in multilayer body 12. Yet, the advantageous effects described above may favorably reduce the risk.

If ratio A of the total area of first voids 40 in outer layer portion 22a on first lateral surface side or outer layer portion 22b on second lateral surface side relative to the area of outer layer portion 22a on first lateral surface side or outer layer portion 22b on second lateral surface side in a cross section of multilayer body 12 (WT cross section at ½L position) falls below about 0.02%, the inverse piezoelectric-induced stress resulting from dielectric layers 14 may be difficult to disperse, increasing the degree of deformation of multilayer body 12. As a result, the risk of cracks may be poorly controlled.

If ratio A of the total area of first voids 40 in outer layer portion 22a on first lateral surface side or outer layer portion 22b on second lateral surface side relative to the area of outer layer portion 22a on first lateral surface side or outer layer portion 22b on second lateral surface side in a cross section of multilayer body 12 (WT cross section at ½L position) exceeds about 0.2%, outer layer portion 22a or 22b on first or second lateral surface side may reduce in strength, undermining or losing the controllability of deformation that possibly occurs under the inverse piezoelectric effect of dielectric layers 14. As a result, the risk of cracks may be poorly controlled.

Next, non-limiting examples of methods of measurement are hereinafter described.

(1) Method of measuring length T in direction of layer lamination x that connects first main surface 12a and second main surface 12b of multilayer body 12

A method of measuring length T in direction of layer lamination x that connects first main surface 12a and second main surface 12b of multilayer body 12 starts with exposing a surface in a cross section of multilayer ceramic capacitor 10. To be more specific, until the position of ½L in multilayer ceramic capacitor 10 is reached, this capacitor is polished to be parallel or substantially parallel to first end surface 12e or second end surface 12f, so that the WT cross section is exposed. Then, length T in direction of layer lamination x that connects first main surface 12a and second main surface 12b of multilayer body 12 is measured with a microscope at the position of ½W in the exposed WT cross section.

(2) Method of measuring length G in direction of layer lamination x of outer layer portion 20a on first main surface side or outer layer portion 20b on second main surface side A method of measuring of length G in direction of layer lamination x of outer layer portion 20a on first main surface side or outer layer portion 20b on second main surface side in multilayer body 12 starts with exposing a surface in a cross section of multilayer ceramic capacitor 10. To be more specific, until the position of about ½L in multilayer ceramic capacitor 10 is reached, this capacitor is polished to be parallel or substantially parallel to first end surface 12e or second end surface 12f, so that the WT cross section is exposed. Then, length G in direction of layer lamination x outer layer portion 20a on first main surface side or outer layer portion 20b on second main surface side is measured with a microscope at the position of about ½W in the exposed WT cross section.

(3) The ratio of length G in direction of layer lamination x of outer layer portion 20a on first main surface side or outer layer portion 20b on second main surface side relative to length T in direction of layer lamination x that connects first main surface 12a and second main surface 12b of multilayer body 12 is calculated from G/T based on results of measurement obtained in (1) and (2) described above.

(4) Method of measuring width W in direction of width y that connects first lateral surface 12c and second lateral surface 12d of multilayer body 12

A method of measuring width W in direction of width y that connects first lateral surface 12c and second lateral surface 12d of multilayer body 12 starts with exposing a surface in a cross section of multilayer ceramic capacitor 10. To be more specific, until the position of about ½L in multilayer ceramic capacitor 10 is reached, this capacitor is polished to be parallel or substantially parallel to first end surface 12e or second end surface 12f, so that the WT cross section is exposed. Then, width W in direction of width y that connects first lateral surface 12c and second lateral surface 12d of multilayer body 12 is measured with a microscope at the position of about ½T in the exposed WT cross section.

(5) Method of measuring width g in direction of width y of outer layer portion 22a on first lateral surface side or outer layer portion 22b on second lateral surface side A method of measuring of width g in direction of width y of outer layer portion 22a on first lateral surface side or outer layer portion 22b on second lateral surface side starts with exposing a surface in a cross section of multilayer ceramic capacitor 10. To be more specific, until the position of about ½L in multilayer ceramic capacitor 10 is reached, this capacitor is polished to be parallel or substantially parallel to first end surface 12e or second end surface 12f, so that the WT cross section is exposed. Then, width g in direction of width y of outer layer portion 22a on first lateral surface side or outer layer portion 22b on second lateral surface side is measured with a microscope at the position of about ½T in the exposed WT cross section.

(6) The ratio of width g in direction of width y of outer layer portion 22a on first lateral surface side or outer layer portion 22b on second lateral surface side relative to width W in direction of width y that connects first lateral surface 12c and second lateral surface 12d of multilayer body 12 is calculated from g/W based on results of measurement obtained in (4) and (5) described above.

(7) Method of checking first voids 40 in outer layer portion 22a on first lateral surface side and outer layer portion 22b on second lateral surface side, and method of measuring ratio A of the total area of first voids 40 in outer layer portion 22a on first lateral surface side or outer layer portion 22b on second lateral surface side relative to the area of outer layer portion 22a on first lateral surface side or outer layer portion 22b on second lateral surface side in a cross section of multilayer body 12 (WT cross section at about ½L position).

A method of checking first voids 40 in outer layer portion 22a on first lateral surface side and outer layer portion 22b on second lateral surface side starts with exposing a surface in a cross section of multilayer ceramic capacitor 10. To be more specific, until the position of about ½L in multilayer ceramic capacitor 10 is reached, this capacitor is polished to be parallel or substantially parallel to first end surface 12e or second end surface 12f, so that the WT cross section is exposed. Then, outer layer portion 22a on first lateral surface side and outer layer portion 22b on second lateral surface side in the exposed WT cross section are observed with a scanning electron microscope (SEM) in the following visual fields: visual field most proximate to outer layer portion 20a on first main surface side (region illustrated with $22a_1$ or $22b_1$ in FIG. 7), visual field most proximate to outer layer portion 20b on second main surface side (region illustrated with $22a_2$ or $22b_2$ in FIG. 7), and visual field at the position of ½T in multilayer ceramic capacitor 10 between the visual fields described above (region illustrated with $22a_3$ or $22b_3$ in FIG. 7). The conditions used are about 2000-times magnifying power, and acceleration voltage of about 5 kV.

The SEM images thus obtained are subjected to a binary analysis using an image analysis software (WinROOF, supplied by MITANI Corporation) to calculate a first void ratio A which is the ratio of the total area of first voids 40 in outer layer portion 22a on first lateral surface side or outer layer portion 22b on second lateral surface side relative to the area of outer layer portion 22a on first lateral surface side or outer layer portion 22b on second lateral surface side.

First, the following visual field areas in outer layer portion 22a on first lateral surface side are defined: A1 is the area of a visual field most proximate to outer layer portion 20a on first main surface side (area of $22a_1$ in FIG. 7), A2 is the area of a visual field most proximate to outer layer portion 20b on second main surface side (area of 22a2 in FIG. 7), and A3 is the area of a visual field at the position of about ½T in multilayer ceramic capacitor 10 between the visual fields described above (area of $22a_3$ in FIG. 7). Further, the following visual field areas in outer layer portion 22b on second lateral surface side are defined: A4 is the area of a visual field most proximate to outer layer portion 20a on first main surface side (area of 22b1 in FIG. 7), A5 is the area of a visual field most proximate to outer layer portion 20b on second main surface side (area of 22b2 in FIG. 7), and A6 is the area of a visual field at the position of about ½T in multilayer ceramic capacitor 10 between the visual fields described above (area of 22b3 in FIG. 7). The areas of A1 to A6 are calculated by the binary analysis using the image analysis software (WinROOF).

Of the areas thus calculated by the binary analysis using the image analysis software (WinROOF), the following void areas in outer layer portion 22a on first lateral surface side are defined: a1 is a void area in the visual field area most proximate to outer layer portion 20a on first main surface side (void area of $22a_1$ in FIG. 7), a2 is a void area in the visual field area most proximate to outer layer portion 20b on second main surface side (void area of 22a2 in FIG. 7), and a3 is a void area at the position of about ½T in multilayer ceramic capacitor 10 between the visual field areas described above (void area of 22a3 in FIG. 7). Further, the following void areas in outer layer portion 22b on second lateral surface side are defined: a4 is a void area in the visual field area most proximate to outer layer portion 20a on first main surface side (void area of 22b1 in FIG. 7), a5 is a void area in the visual field area most proximate to outer layer portion 20b on second main surface side (void area of 22b2 in FIG. 7), and a6 is a void area at the position of about ½T in multilayer ceramic capacitor 10 between the visual field areas described above (void area of 22b3 in FIG. 7). The areas of a1 to a6 are calculated by the binary analysis using the image analysis software (WinROOF).

First void ratio A may be calculated from the ratio of the total void area relative to the total area An of the observed visual fields in outer layer portion 22a on first lateral surface side or outer layer portion 22b on second lateral surface side. In the present preferred embodiment, the values of first void ratio A for A1, A2, A3, A4, A5 and A6 are averaged, and an average value thus obtained is used as first void ratio A of the entire outer layer portions 22a and 22b on first and second lateral surface sides.

The Vickers hardness of outer layer portion 22a on first lateral surface side or outer layer portion 22b on second lateral surface side may preferably be, for example, greater than or equal to about 1000 HV and less than or equal to about 1200 HV. Thus, outer layer portion 22a on first lateral surface side and outer layer portion 22b on second lateral surface side may both have improved strength. The inverse piezoelectric effect of dielectric layers 14 may be produced when an electric field is applied to multilayer ceramic capacitor 10. This may possibly cause the elastic motion of inner layer portion 18, increasing the risk of cracks in multilayer body 12. Yet, the advantageous effects described above may favorably reduce the risk.

The measurement of the Vickers hardness of outer layer portion 22a on first lateral surface side or outer layer portion 22b on second lateral surface side starts with exposing a surface in a cross section of multilayer ceramic capacitor 10. To be more specific, until the position of about ½L in multilayer ceramic capacitor 10 is reached, this capacitor is polished to be parallel or substantially parallel to first end surface 12e or second end surface 12f, so that the WT cross section is exposed. In outer layer portion 22a on first lateral surface side and outer layer portion 22b on second lateral surface side in the exposed WT cross section, an indenter is hit into each sample surface with a micro-hardness tester at the following positions: positions most proximate to outer layer portion 20a on first main surface side ($22a_1$, $22b_1$ in FIG. 7), positions most proximate to outer layer portion 20b on second main surface side (22a2, 22b2 in FIG. 7), and positions of about ½T in the multilayer ceramic capacitor between the positions described above (22a3, 22b3 in FIG. 7). In the present preferred embodiment, the conditions used are the indenter is a diamond pyramid indenter, load F to be applied is about 245.2 mN, and duration of the test force is about five seconds. Then, lengths d1 and d2 of diagonal lines of each indentation formed on the sample surface by the indenter are measured with lenses having about 400-times magnifying power (ocular lens: ×10, objective lens: ×40). Then, the Vickers hardness HV is measured from the following formula:

$$HV=0.1891 \times F/d^2 \, d=(d1+d2)/2.$$

External Electrode

An external electrode 30 includes a first external electrode 30a and a second external electrode 30b.

First external electrode 30a is connected to first inner electrode layers 16a and is disposed on first end surface 12e. First external electrode 30a may also be disposed on a portion of first main surface 12a and a portion of second main surface 12b and/or on a portion of first lateral surface 12c and a portion of second lateral surface 12d. In the present preferred embodiment, first external electrode 30a is disposed on first end surface 12e and is then extended from there to a portion of first main surface 12a and a portion of second main surface 12b and also to a portion of first lateral surface 12c and a portion of second lateral surface 12d.

Second external electrode 30b is connected to second inner electrode layer 16b and is disposed on second end surface 12f. Second external electrode 30b may also be disposed on a portion of first main surface 12a and a portion of second main surface 12b and/or on a portion of first lateral surface 12c and a portion of second lateral surface 12d. In the present preferred embodiment, second external electrode 30b is disposed on second end surface 12f and is then extended from there to a portion of first main surface 12a and a portion of second main surface 12b and also to a portion of first lateral surface 12c and a portion of second lateral surface 12d.

First external electrode 30a and second external electrode 30b each include a base electrode layer 32 and a plating layer 34. The base electrode layer 32 is disposed on the surface of multilayer body 12. The plating layer 34 covers base electrode layer 32.

Base Electrode Layer

Base electrode layer 32 is disposed on first end surface 12e and second end surface 12f. On sides respectively closer to first external electrode 30a and second external electrode 30b, base electrode layer 32 may also be disposed on a portion of first main surface 12a and a portion of second main surface 12b, and/or, on a portion of first lateral surface 12c and a portion of second lateral surface 12d. In the present preferred embodiment, base electrode layer 32, on the side closer to first external electrode 30a, is disposed on first end surface 12e and is extended from there to a portion of first main surface 12a and a portion of second main surface 12b. Also, base electrode layer 32, on the side closer to second external electrode 30b, is disposed on second end surface 12f and is extended from there to a portion of first lateral surface 12c and a portion of second lateral surface 12d.

Base electrode layer 32 includes a first base electrode layer 32a and a second base electrode layer 32b.

Base electrode layer 32 includes, for example, at least one selected from a baked layer, an electrically conductive resin layer and a thin film layer.

Baked Layer

The baked layer includes a glass component and a metal(s). The glass component of the baked layer includes at least one selected from, for example, B, Si, Ba, Mg, Al, and Li. The metal of the baked layer may be at least one selected from, for example, Cu, Ni, Ag, Pd, Ag—Pd alloy and Au.

The base electrode layer may include a plurality of baked layers. To obtain the baked layer, an electrically conductive paste including a metal and glass is applied and adherably baked to multilayer body 12. The baked layer may be obtained as described below. A multilayer chip including inner electrode layers 16 and dielectric layers 14 and an electrically conductive paste applied to this multilayer chip are all baked together, or a multilayer chip including inner electrode layers 16 and dielectric layers 14 is baked to obtain multilayer body 12, and multilayer body 12 is coated with an electrically conductive paste and then baked. When a multilayer chip including inner electrode layers 16 and dielectric layers 14 and an electrically conductive paste applied to this multilayer chip are all baked together, a material including, for example, a dielectric component instead of the glass component may be used to obtain the baked layer.

The thickness of a first baked layer on first end surface 12e in the direction of length that connects the first end surface and the second end surface at the center or substantially the center in the direction of layer lamination that connects the first main surface and the second main surface (i.e., thickness of the base electrode layer at the center or substantially the center of first end surface 12e) may preferably be, for example, greater than or equal to about 3 µm and less than or equal to about 160 µm.

The thickness of a second baked layer on second end surface 12f in the direction of length that connects the first end surface and the second end surface at substantially the center in the direction of layer lamination that connects the first main surface and the second main surface (i.e., thickness of the base electrode layer at the center or substantially the center of second end surface 12f) may preferably be, for example, greater than or equal to about 3 µm and less than or equal to about 160 µm.

The thickness of the first baked layer in a portion of the first main surface and in a portion of the second main surface in the direction of layer lamination that connects the first main surface and the second main surface at the center or substantially the center in the direction of length that connects the first end surface and the second end surface may preferably be, for example, greater than or equal to about 3 µm and less than or equal to about 40 µm.

The thickness of the second baked layer in a portion of the first main surface and in a portion of the second main surface in the direction of layer lamination that connects the first main surface and the second main surface at the center or substantially the center in the direction of length that connects the first end surface and the second end surface may preferably be, for example, greater than or equal to about 3 µm and less than or equal to about 40 µm.

Electrically Conductive Resin Layer

In a case in which an electrically conductive resin layer is used as base electrode layer 32, the electrically conductive resin layer may be disposed so as to cover the baked layer. The electrically conductive resin layer may be directly disposed on multilayer body 12 without the baked layer interposed therebetween.

The electrically conductive resin layer may cover the all or a portion of base electrode layer 32.

Base electrode layer 32 may include a plurality of electrically conductive resin layers.

The electrically conductive resin layer may include, for example, a thermosetting resin(s) and metallic components.

Specific examples of the thermosetting resin may include known thermosetting resins, for example, epoxy resins, phenol resins, urethane resins, silicone resins and polyimide resins. Of these examples, epoxy resins having high heat resistance, moisture resistance, and adhesive strength may be a preferable material.

The electrically conductive resin layer may preferably include a curing agent in addition to the thermosetting resin(s). When the base resin is, for example, an epoxy resin, the curing agent used may be selected from the known compounds including, for example, phenol-based, amine-based, anhydride-based, imidazole-based, activated ester-based, and amide-imide-based compounds.

The metal that can be included in the electrically conductive resin layer may be selected from, for example, Ag, Cu, Ni, Sn, Bi and alloys including one or more of these metals. Other examples may include, for example, materials using Ag-coated metallic powder. When the Ag-coated metallic powder is used, the metallic powder may preferably be obtained from, for example, Cu, Ni, Sn, Bi or an alloy including one or more of these metals. The Ag-coated metallic powder may preferably be included in the electrically conductive resin layer, because Ag having the lowest specific resistance among all of the metals is very suitable for electrodes, and a noble metal, Ag, has excellent oxidation resistance and weather resistance. Further, Ag may allow cost reduction of the base metal in addition to its advantageous properties described above. The metal to be included in the electrically conductive resin layer may be, for example, anti-oxidized Cu or Ni. The metal to be included in the electrically conductive resin layer may be, for example, Sn-, Ni- or Cu-coated metallic powder. When the Sn-, Ni- or Cu-coated metallic powder is used, the metallic powder may preferably be obtained from, for example, Ag, Cu, Ni, Sn, Bi or an alloy including one or more of these metals.

The metal to be included in the electrically conductive resin layer may be spherical or flat particles. Preferably, the metal powder may be a mixture of spherical metallic particles and flat metallic particles. The metal included in the electrically conductive resin layer provides electrical conductivity to the electrically conductive resin layer. Specifically, electrically conductive filler particles (metal particles included in the electrically conductive resin layer) contact each other to provide an energizing path inside of the electrically conductive resin layer.

The electrically conductive resin layer including the thermosetting resin may be more flexible than base electrode layer 32 including the plating layer and baked electrically conductive paste. If any physical impact or thermal cycle-associated impact is applied to the multilayer ceramic capacitor, the electrically conductive resin layer may define and function as a buffer layer and effectively prevent possible cracks in the multilayer ceramic capacitor.

The thickest portion of the electrically conductive resin layer may have, for example, a thickness greater than or equal to about 10 µm and less than or equal to about 150 µm.

Thin Film Layer

The thin film layer may be formed by a technique conventionally used for thin film formation, for example, sputtering or vapor deposition, and may be a layer having a thickness, for example, less than or equal to about 1 µm in which metallic particles are deposited.

Plating Layer

Plating layer 34 includes a first plating layer 34a and a second plating layer 34b.

First plating layer 34a covers first base electrode layer 32a.

Second plating layer 34b covers second base electrode layer 32b.

Plating layer 34 includes at least one selected from, for example, Cu, Ni, Sn, Ag, Pd, Ag—Pd alloys and Au.

A plurality of plating layers 34 may be provided. Preferably, plating layer 34 has a bi-layer structure plated with Ni and Sn. The NI-plated layer may reduce or prevent possible erosion of base electrode layer 32 caused by a solder used to mount of multilayer ceramic capacitor 10. The Sn-plated layer may improve solder wettability during the mounting of multilayer ceramic capacitor 10 and thus facilitate the mounting process.

Plating layer 34 may preferably have, for each layer, a thickness, for example, greater than or equal to about 2 µm and less than or equal to about 15 µm.

External electrode 30 may solely include plating layer 34 without base electrode layer 32.

A structure is hereinafter described, in which plating layer 34 alone is provided without base electrode layer 32.

In first external electrode 30a and second external electrode 30b, plating layer 34 may be directly provided on the surface of multilayer body 12 without base electrode layer 32 interposed therebetween. Specifically, multilayer ceramic capacitor 10 may have a structure in which plating layer 34 is directly electrically connected to first inner electrode layers 16a and second inner electrode layers 16b. In this instance, plating layer 34 may be formed after a catalyst is applied to the surface of multilayer body 12 as a pretreatment.

When plating layer 34 is directly provided on multilayer body 12 in the absence of base electrode layer 32, thickness reduction of base electrode layer 32 may enable to height reduction, i.e., thickness reduction of the multilayer ceramic capacitor or thickness increase of multilayer body 12 or inner layer portion 18 (effective layer portion). Thus, a higher degree of freedom may be available in designing thinner chips.

Plating layer 34 may preferably include a lower plating electrode provided on the surface of multilayer body 12 and an upper plating electrode provided on the surface of the lower plating electrode.

Preferably, the lower plating electrode and the upper plating electrode may each include, for example, at least one selected from Cu, Ni, Sn, Pb, Au, Ag, Pd, Bi, Zn and alloys containing one or more of these metals.

The lower plating electrode may preferably be made from, for example, Ni that defines and functions as a barrier against solder, while the upper plating electrode may preferably be made from, for example, Sn and/or Au having solder wettability.

When, for example, first inner electrode layer 16a and second inner electrode layer 16b are made from Ni, the lower plating electrode may preferably be made from Cu that bonds well to Ni. The upper plating electrode may be optionally provided depending on the need. First external electrode 30a and second external electrode 30b may each solely include the lower plating electrode.

In plating layer 34, the upper plating electrode may be the outermost layer, or one or more other plating electrodes may be further provided on the surface of the upper plating electrode.

When base electrode layer 32 is unused, plating layer 34 may preferably have, for each layer, a thickness, for example, greater than or equal to about 1 µm and less than or equal to about 15 µm. Plating layer 34 may preferably include no glass. The ratio of a metal(s) per unit volume of plating layer 34 may preferably be, for example, greater than or equal to about 99 percent by volume.

A dimension $L_M$ refers to a dimension in direction of length z of multilayer ceramic capacitor 10, including multilayer body 12 and external electrode 30. Preferably, dimension $L_M$ may be, for example, greater than or equal to about 0.1 mm and less than or equal to about 10 mm. A dimension $W_M$ refers to a dimension in direction of width y of multilayer ceramic capacitor 10, including multilayer body 12 and external electrode 30. Preferably, dimension $W_M$ may be, for example, greater than or equal to about 0.1 mm and less than or equal to about 10 mm. A dimension $T_M$ refers to a dimension in direction of layer lamination x of multilayer ceramic capacitor 10. Preferably, dimension $T_M$ may be, for example, greater than or equal to about 0.1 mm and less than or equal to about 10 mm.

Second Preferred Embodiment 1-2. Multilayer Ceramic Capacitor

Figure 8:
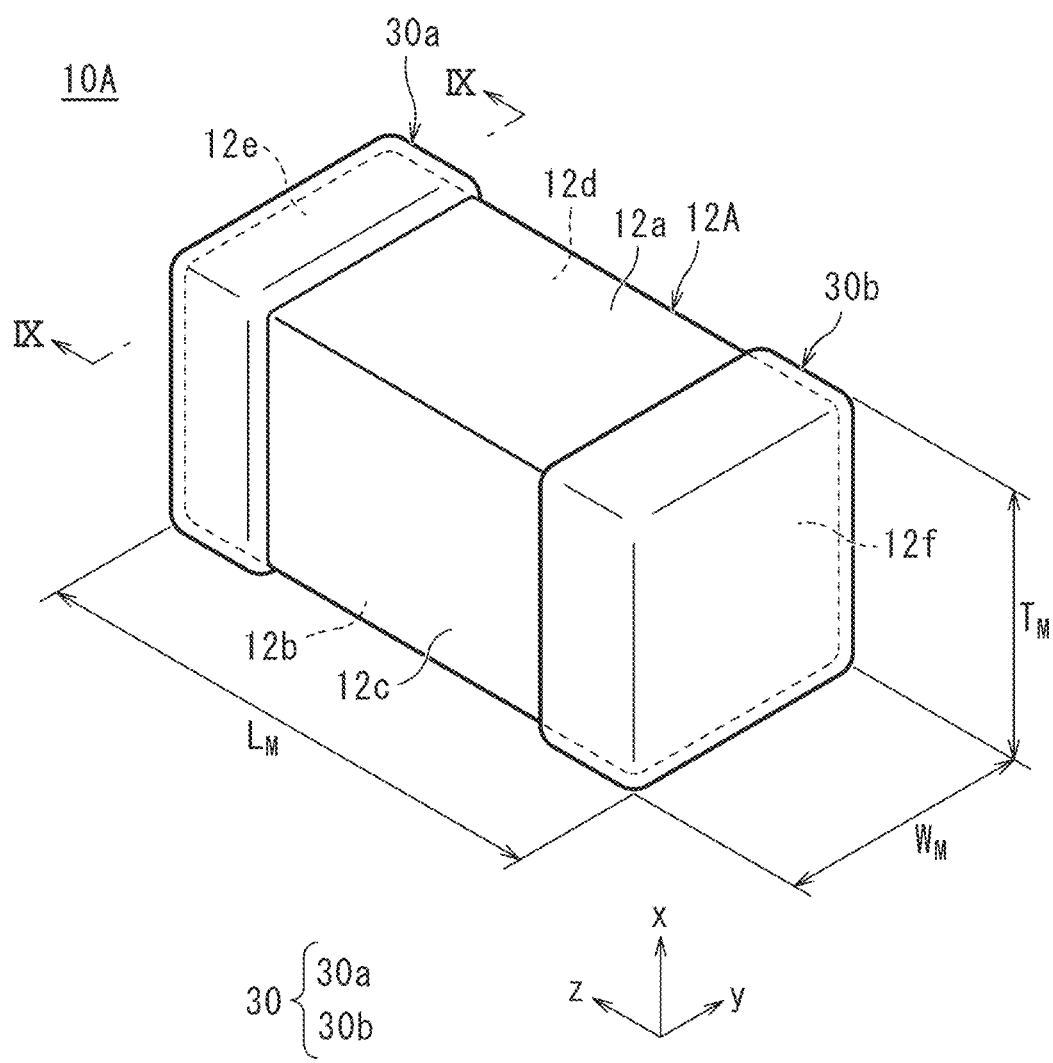
FIG. 8 is a perspective external view of an exemplified multilayer ceramic capacitor according to a second preferred embodiment of the present invention.
Figure 9:
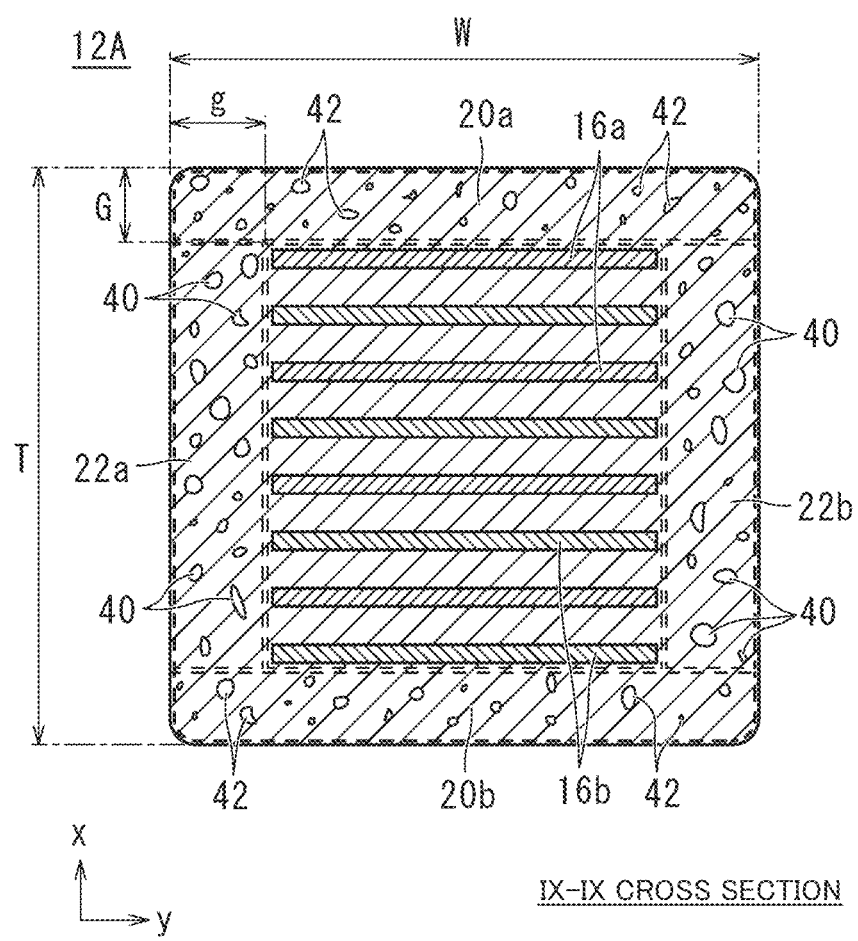
FIG. 9 is a schematic view of a multilayer body in WT cross section according to the second preferred embodiment of the present invention.

A multilayer ceramic capacitor 10A according to a second preferred embodiment of the present invention is hereinafter described with reference to FIGS. 8 and 9. FIG. 8 is a perspective external view of the multilayer ceramic capacitor according to the second preferred embodiment. FIG. 9 is a schematic view of a multilayer body in WT cross section according to the second preferred embodiment.

Multilayer ceramic capacitor 10A according to the second preferred embodiment differs from multilayer ceramic capacitor 10 according to the first preferred embodiment in that first voids 40 are provided in outer layer portion 22a on first lateral surface side and outer layer portion 22b on second lateral surface side of a multilayer body 12A, and second voids 42 are provided in outer layer portion 20a on first main surface side and outer layer portion 20b on second main surface side of multilayer body 12A. The same reference signs are used for any structural elements similar or corresponding to those described in the first preferred embodiment, detailed description of which will be omitted.

As illustrated in FIGS. 8 and 9, multilayer ceramic capacitor 10A includes multilayer body 12A and an external electrode 30. Multilayer body 12A has a structure in which a plurality of dielectric layers 14 and a plurality of inner electrode layers 16 are alternately laminated on each other. Multilayer body 12A includes an outer layer portion 20a on first main surface side, an outer layer portion 20b on second main surface side, an outer layer portion 22a on first lateral surface side, and an outer layer portion 22b on second lateral surface side. There are first voids 40 in outer layer portion 22a on first lateral surface side and outer layer portion 22b on second lateral surface side of multilayer body 12A.

There are a plurality of second voids 42 in outer layer portion 20a on first main surface side and outer layer portion 20b on second main surface side. A ratio B of the total area of second voids 42 in outer layer portion 20a on first main surface side or outer layer portion 20b on second main surface side relative to an area of outer layer portion 20a on first main surface side or outer layer portion 20b on second main surface side in a cross section of multilayer body 12 (WT cross section at about ½L position) may preferably be, for example, greater than or equal to about 0.5% and less than or equal to about 0.7%.

This may enable second voids 42 to effectively disperse any inverse piezoelectric-induced stress, while achieving both of a higher degree of density and a smaller tensile stress at the same time in outer layer portion 20a on first main surface side and outer layer portion 20b on second main surface side. As a result, outer layer portion 20a on first main surface side and outer layer portion 20b on second main surface side may have improved strength, and multilayer body 12 may be less likely to deform. The inverse piezoelectric effect of dielectric layers 14 may be produced when an electric field is applied to multilayer ceramic capacitor 10. This may possibly cause the elastic motion of inner layer portion 18, increasing the risk of cracks in multilayer body 12. Yet, the advantageous effects described above may favorably reduce the risk.

In case ratio B of the total area of second voids 42 in outer layer portion 20a on first main surface side or outer layer portion 20b on second main surface side relative to the area of outer layer portion 20a on first main surface side or outer layer portion 20b on second main surface side in a cross section of multilayer body 12 (WT cross section at ½L position) falls below 0.5%, outer layer portion 20a on first main surface side and outer layer portion 20b on second main surface side may be subject to a greater tensile stress, undermining or losing the controllability of deformation possibly caused by the inverse piezoelectric effect of dielectric layers 14. As a result, the risk of cracks may fail to be effectively controlled.

If ratio B of the total area of second voids 42 in outer layer portion 20a on first main surface side or outer layer portion 20b on second main surface side relative to the area of outer layer portion 20a on first main surface side or outer layer portion 20b on second main surface side in a cross section of multilayer body 12 (WT cross section at about ½L position) exceeds about 0.7%, outer layer portion 20a on first main surface side or outer layer portion 20b on second main surface side may have a reduced strength, undermining or losing the controllability of deformation of multilayer body 12. As a result, the risk of cracks may fail to be effectively controlled.

Below are a non-limiting example of a method of checking second voids 42 in outer layer portion 20a on first main surface side and outer layer portion 20b on second main surface side, and a non-limiting example of a method of calculating ratio B of the total area of second voids 42 in outer layer portion 20a on first main surface side or outer layer portion 20b on second main surface side relative to the area of outer layer portion 20a on first main surface side or outer layer portion 20b on second main surface side in a cross section of multilayer body 12 (WT cross section at about ½L position).

The method of checking second voids 42 in outer layer portion 20a on first main surface side and outer layer portion 20b on second main surface side starts with exposing a surface in a cross section of multilayer ceramic capacitor 10A. To be more specific, until the position of about ½L in multilayer ceramic capacitor 10A is reached, this capacitor is polished to be parallel or substantially parallel to first end surface 12e or second end surface 12f, so that the WT cross section is exposed. Then, outer layer portion 20a on first main surface side and outer layer portion 20b on second main surface side in the exposed WT cross section are observed with a scanning electron microscope (SEM) in the following visual fields: visual field most proximate to outer layer portion 22a on first lateral surface side (region illustrated with $20a_1$ or $20b_1$ in FIG. 7), visual field most proximate to outer layer portion 22b on second lateral surface side (region illustrated with $20a_2$ or $20b_2$ in FIG. 7), and visual field at the position of about ½W in multilayer ceramic capacitor 10A between the visual fields described above (region illustrated with $20a_3$ or $20b_3$ in FIG. 7). The conditions used in the present preferred embodiment are about 2000-times magnifying power, and acceleration voltage of about 5 kV.

The SEM images thus obtained are subjected to a binary analysis using an image analysis software (WinROOF, supplied by MITANI Corporation) to calculate a second void ratio B which is the ratio of the total area of second voids 42 in outer layer portion 20a on first main surface side or outer layer portion 20b on second main surface side relative to the area of outer layer portion 20a on first main surface side or outer layer portion 20b on second main surface side.

First, the following visual field areas in outer layer portion 20a on first main surface side are defined: B1 is the area of a visual field most proximate to outer layer portion 22a on first lateral surface side (area of $20a_1$ in FIG. 7), B2 is the area of a visual field most proximate to outer layer portion 22b on second lateral surface side (area of $20a_2$ in FIG. 7), and B3 is the area of a visual field at the position of about ½W in multilayer ceramic capacitor 10A between the visual fields described above (area of $20a_3$ in FIG. 7). First, the following visual field areas in outer layer portion 20b on second main surface side are defined: B4 is the area of a visual field most proximate to outer layer portion 22a on first lateral surface side (area of 20b1 in FIG. 7), B5 is the area of a visual field most proximate to outer layer portion 22b on second lateral surface side (area of 20b2 in FIG. 7), and B6 is the area of a visual field at the position of about ½W in multilayer ceramic capacitor 10A between the visual fields described above (area of 20b3 in FIG. 7). The areas of B1 to B6 are calculated by the binary analysis using the image analysis software (WinROOF).

Of the areas thus calculated by the binary analysis using the image analysis software (WinROOF), the following void areas in outer layer portion 20a on first main surface side are defined: b1 is a void area in the visual field area most proximate to outer layer portion 22a on first lateral surface side (void area of $20a_1$ in FIG. 7), b2 is a void area in the visual field area most proximate to outer layer portion 22b on second lateral surface side (void area of $20a_2$ in FIG. 7), and b3 is a void area at the position of about ½W in multilayer ceramic capacitor 10A between the visual field areas described above (void area of 20a3 in FIG. 7). Further, the following void areas in outer layer portion 20b on second main surface side are defined: b4 is a void area in the visual field area most proximate to outer layer portion 22a on first lateral surface side (void area of 20b1 in FIG. 7), b5 is a void area in the visual field area most proximate to outer layer portion 22b on second lateral surface side (void area of 20b2 in FIG. 7), and b6 is a void area at the position of about ½W in multilayer ceramic capacitor 10A between the visual field areas described above (void area of 20b3 in FIG. 7). The areas of b1 to b6 are calculated by the binary analysis using the image analysis software (WinROOF).

Second void ratio B may be calculated from the ratio of the total void area bn relative to the total area Bn of the observed visual fields in outer layer portion 20a on first main surface side and outer layer portion 20b on second main surface side. In this disclosure, the values of second void ratio B for B1, B2, B3, B4, B5 and B6 are averaged, and an average value thus obtained is used as second void ratio B of the entire outer layer portions 20a and 20b on first and second main surface sides.

The Vickers hardness of outer layer portion 20a on first main surface side or outer layer portion 20b on second main surface side may preferably be, for example, greater than or equal to about 600 HV and less than or equal to about 800 HV. Thus, a smaller tensile stress and a higher degree of density may both be achieved in outer layer portions 20a on first main surface side and outer layer portion 20b on second main surface side. As a result, outer layer portion 20a on first main surface side and outer layer portion 20b on second main surface may both have improved strength, and multilayer body 12A may be less likely to deform. The inverse piezoelectric effect of dielectric layers 14 may be produced when an electric field is applied to multilayer ceramic capacitor 10A. This may possibly cause the elastic motion of inner layer portion 18, increasing the risk of cracks in multilayer body 12A. Yet, the advantageous effects described above may favorably reduce the risk.

The measurement of the Vickers hardness of outer layer portion 20a on first main surface side or outer layer portion 20b on second main surface side starts with exposing a surface in a cross section of multilayer ceramic capacitor 10A. To be more specific, until the position of about ½L in multilayer ceramic capacitor 10A is reached, this capacitor is polished to be parallel or substantially parallel to first end surface 12e or second end surface 12f, so that the WT cross section is exposed. In outer layer portion 20a on first main surface side and outer layer portion 20b on second main surface side in the exposed WT cross section, an indenter is hit into each sample surface with a micro-hardness tester at the following positions: positions most proximate to outer layer portion 22a on first lateral surface side ($20a_1$, $20b_1$ in FIG. 7), positions most proximate to outer layer portion 22b on second lateral surface side ($20a_2$, $20b_2$ in FIG. 7), and positions of about ½W in multilayer ceramic capacitor 10A between the positions described above ($20a_3$, $20b_3$ in FIG. 7). In the present preferred embodiment, the conditions used then are: the indenter is a diamond pyramid indenter, load F to be applied is about 245.2 mN, and duration of the test force is about five seconds. Then, lengths d1 and d2 of diagonal lines of each indentation formed on the sample surface by the indenter are measured with lenses having about 400-times magnifying power (ocular lens: ×10, objective lens: ×40). Then, the Vickers hardness HV is measured from the following formula:

$$HV = 0.1891 \times F/d^2 d = (d1+d2)/2.$$

Third Preferred Embodiment 1-3. Multilayer Ceramic Capacitor

Figure 10:
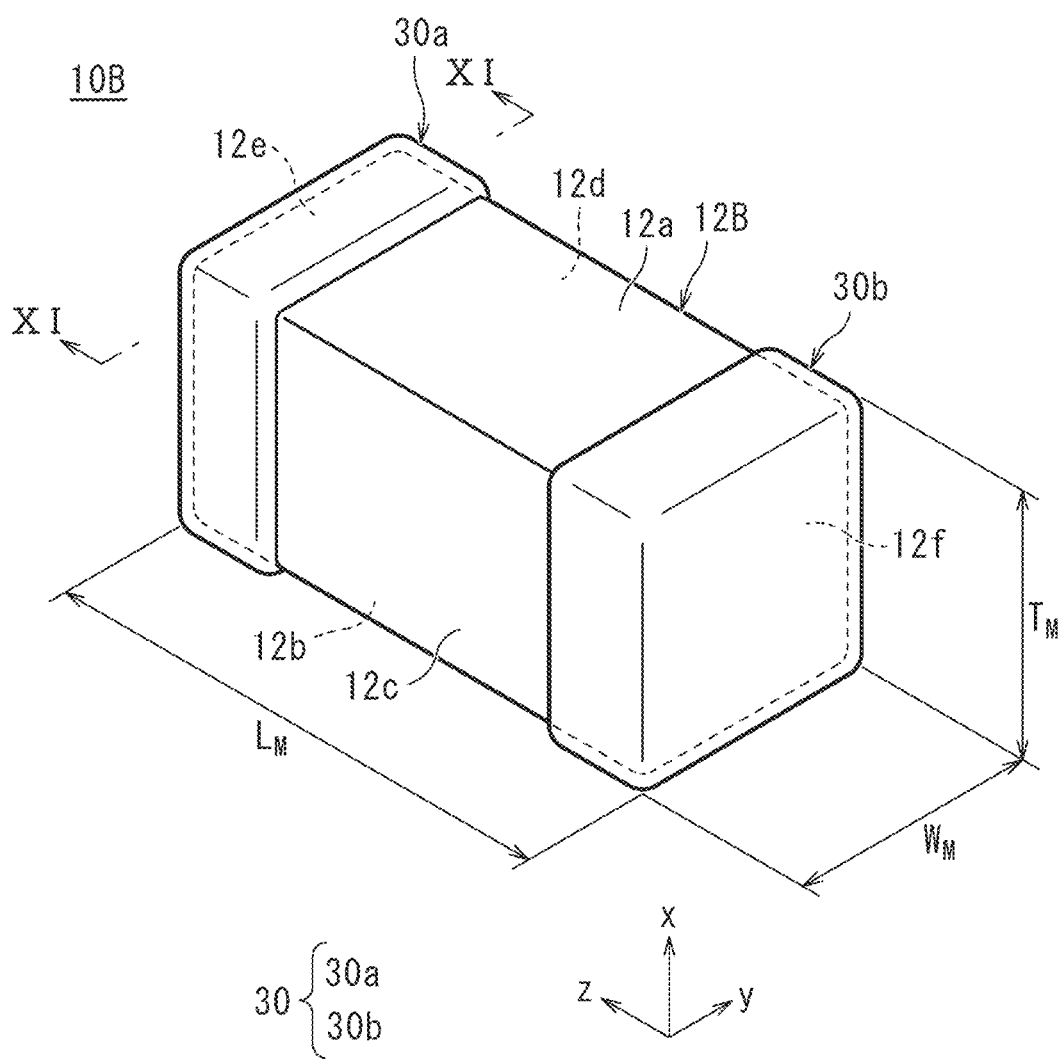
FIG. 10 is a perspective external view of an exemplified multilayer ceramic capacitor according to a third preferred embodiment of the present invention.
Figure 11:
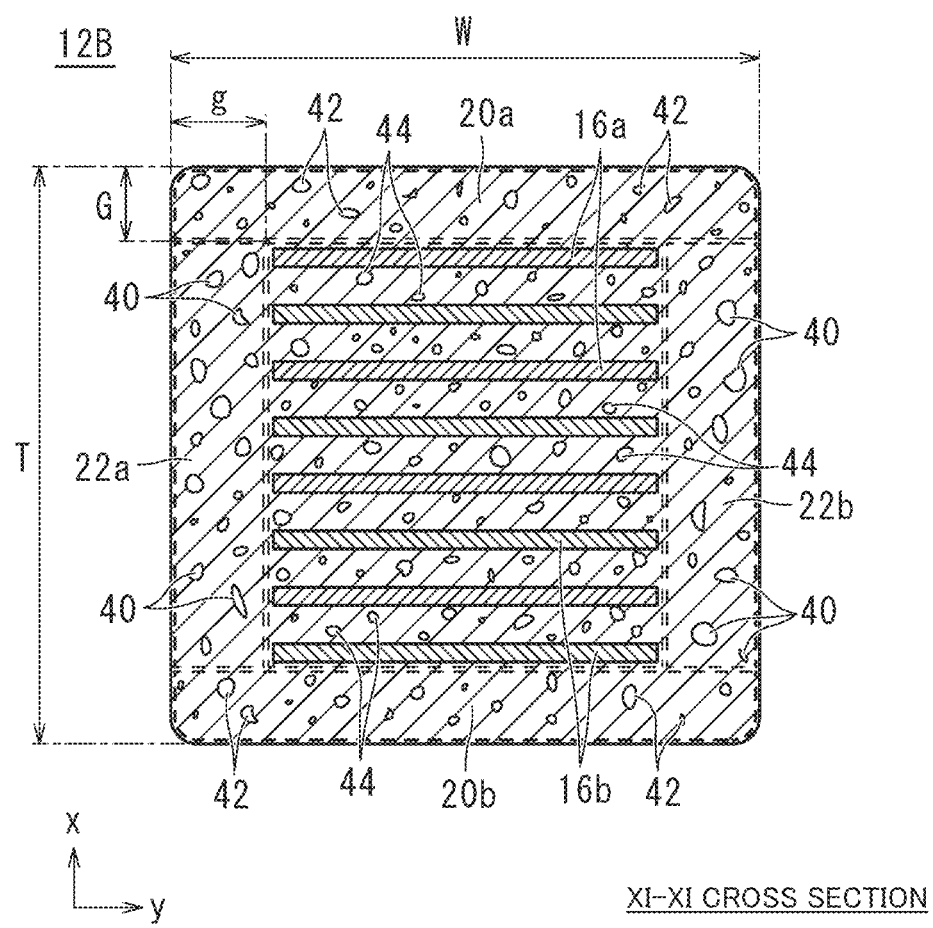
FIG. 11 is a schematic view of a multilayer body in WT cross section according to the third preferred embodiment of the present invention.

A multilayer ceramic capacitor 10B according to a third preferred embodiment of the present invention is hereinafter described with reference to FIGS. 10 and 11. FIG. 10 is a perspective external view of an example of the multilayer ceramic capacitor according to the third preferred embodiment. FIG. 11 is a schematic view of a multilayer body in WT cross section according to the third preferred embodiment.

Multilayer ceramic capacitor 10B according to the third preferred embodiment differs from multilayer ceramic capacitor 10A according to the second preferred embodiment in that there are third voids 44 in dielectric layers 14 between first inner electrode layers 16a and second inner electrode layers 16b of multilayer body 12B. The same reference signs are used to denote any structural elements similar or corresponding to those described in the first and second preferred embodiments, detailed description of which will be omitted.

As illustrated in FIGS. 10 and 11, multilayer ceramic capacitor 10B includes a multilayer body 12B and an external electrode 30. Multilayer body 12B has a structure in which a plurality of dielectric layers 14 and a plurality of inner electrode layers 16 are alternately laminated on each other. In multilayer body 12B, there are first voids 40 in outer layer portion 22a on first lateral surface side and in outer layer portion 22b on second lateral surface side, and there are second voids 42 in outer layer portion 20a on first main surface side and in outer layer portion 20b on second main surface side.

Inner electrode layers 16 each include a first inner electrode layer 16a extending onto first end surface 12e and a second inner electrode layer 16b extending onto second end surface 12f. First inner electrode layer 16a and second inner electrode layer 16b are opposed to each other with dielectric layer 14 interposed therebetween. There are third voids 44 in dielectric layers 14 between first inner electrode layers 16a and second inner electrode layers 16b. A ratio C of the total area of third voids 44 in dielectric layers 14 in portions between first inner electrode layers 16a and second inner electrode layers 16b relative to an area of dielectric layers 14 in portions between first inner electrode layers 16a and second inner electrode layers 16b in a cross section of multilayer body 12B (WT cross section at about ½L position) may preferably be, for example, greater than or equal to about 0.2% and less than or equal to about 0.8%.

This may allow third voids 44 to effectively disperse any inverse piezoelectric-induced stress, while achieving, at the same time, a higher degree of density in dielectric layer 14 between first inner electrode layer 16a and second inner electrode layer 16b, resulting in improved strength. The inverse piezoelectric effect of dielectric layers 14 may be produced when an electric field is applied to multilayer ceramic capacitor 10B. This may possibly cause the elastic motion of inner layer portion 18, increasing the risk of cracks. Yet, the advantageous effects described above may successfully prevent cracks, if generated, from further spreading to dielectric layers 14.

If ratio C of the total area of third voids 44 in dielectric layers 14 in portions between first inner electrode layers 16a and second inner electrode layers 16b relative to the area of dielectric layers 14 in portions between first inner electrode layers 16a and second inner electrode layers 16b in a cross section of multilayer body 12B (WT cross section at about ½L position) falls below about 0.2%, the inverse piezoelectric-induced stress resulting from dielectric layers 14 may be difficult to disperse, increasing the degree of deformation of multilayer body 12B. As a result, the risk of cracks may be poorly controlled.

If ratio C of the total area of third voids 44 in dielectric layers 14 in portions between first inner electrode layers 16a and second inner electrode layers 16b relative to the area of dielectric layers 14 in portions between first inner electrode layers 16a and second inner electrode layers 16b in a cross section of multilayer body 12B (WT cross section at ½L position) exceeds about 0.8%, dielectric layer 14 in the portion between first inner electrode layer 16a and second inner electrode layer 16b may degrade in strength. As a result, further spread of cracks, if generated, to dielectric layer 14 may be poorly controlled.

Below are described a non-limiting example of a method of checking third voids 44 in dielectric layers 14 between first inner electrode layer 16a and second inner electrode layer 16b, and a non-limiting example of a method of calculating a third void ratio C of the total area of third voids 44 in dielectric layers 14 in portions between first inner electrode layers 16a and second inner electrode layers 16b relative to the area of dielectric layers 14 in portions between first inner electrode layers 16a and second inner electrode layers 16b in a cross section of multilayer body 12B (WT cross section at about ½L position).

The method of checking third voids 44 in dielectric layer 14 between first inner electrode layer 16a and second inner electrode layer 16b starts with exposing a surface in a cross section of multilayer ceramic capacitor 10B. To be more specific, until the position of about ½L in multilayer ceramic capacitor 10B is reached, this capacitor is polished to be parallel or substantially parallel to first end surface 12e or second end surface 12f, so that the WT cross section is exposed. Then, the following dielectric layers 14 between first inner electrode layer 16a and second inner electrode layer 16b in the exposed WT cross section are observed with a scanning electron microscope (SEM): dielectric layer 14 most proximate to outer layer portion 20a on first main surface side ($18_1$, $18_2$, $18_3$ in FIG. 7), dielectric layer 14 most proximate to outer layer portion 20b on second main surface side ($18_4$, $18_5$, $18_6$ in FIG. 7), and dielectric layer 14 at the about ½T position in multilayer ceramic capacitor 10B between dielectric layers 14 described above ($18_7$, $18_8$, $18_9$ in FIG. 7). The conditions used then are about 2000-times magnifying power, and acceleration voltage of about 5 kV.

The SEM images thus obtained are subjected to a binary analysis using an image analysis software (WinROOF) to calculate a third void ratio C.

First, C1 is the area of dielectric layer 14 between first inner electrode layer 16a and second inner electrode layer 16b in a visual field most proximate to outer layer portion 20a on first main surface side and also most proximate to outer layer portion 22a on first lateral surface side (area of $18_1$ in FIG. 7). Further, C2 is the area of dielectric layer 14 between first inner electrode layer 16a and second inner electrode layer 16b in a visual field most proximate to outer layer portion 20a on first main surface side and also most proximate to outer layer portion 22b on second lateral surface side (area of $18_2$ in FIG. 7). Also, C3 is the area of dielectric layer 14 between first inner electrode layer 16a and second inner electrode layer 16b in a visual field at the position of about ½W between the visual fields described above in multilayer ceramic capacitor 10B (area of $18_3$ in FIG. 7).

Similarly, C4 is the area of dielectric layer 14 between first inner electrode layer 16a and second inner electrode layer 16b in a visual field most proximate to outer layer portion 20b on second main surface side and also most proximate to outer layer portion 22a on first lateral surface side (area of $18_4$ in FIG. 7). Similarly, C5 is the area of dielectric layer 14 between first inner electrode layer 16a and second inner electrode layer 16b in a visual field most proximate to outer layer portion 20b on second main surface side and also most proximate to outer layer portion 22b on second lateral surface side (area of $18_5$ in FIG. 7). Similarly, C6 is the area of dielectric layer 14 between first inner electrode layer 16a and second inner electrode layer 16b in a visual field at the position of about ½W between the visual fields described above in multilayer ceramic capacitor 10B (area of $18_6$ in FIG. 7).

Similarly, C7 is the area of dielectric layer 14 between first inner electrode layer 16a and second inner electrode layer 16b in a visual field most proximate to outer layer portion 22a on first lateral surface side in dielectric layer 14 at the position of about ½T between outer layer portion 20a on first main surface side and outer layer portion 20b on second main surface side in multilayer ceramic capacitor 10B (area of $18_7$ in FIG. 7). Similarly, C8 is the area of dielectric layer 14 between first inner electrode layer 16a and second inner electrode layer 16b in a visual field most proximate to outer layer portion 22b on second lateral surface side in dielectric layer 14 at the position of about ½T between outer layer portion 20a on first main surface side and outer layer portion 20b on second main surface side in multilayer ceramic capacitor 10B (area of $18_8$ in FIG. 7). Similarly, C9 is the area of dielectric layer 14 between first inner electrode layer 16a and second inner electrode layer 16b in a visual field at the position of about ½W between the visual fields described above in multilayer ceramic capacitor 10B (area of $18_9$ in FIG. 7).

The areas of C1 to C9 are calculated by the binary analysis using the image analysis software (WinROOF).

Of the areas thus calculated by the binary analysis using the image analysis software (WinROOF), c1 is a void area in dielectric layer 14 between first inner electrode layer 16a and second inner electrode layer 16b in the visual field most proximate to outer layer portion 20a on first main surface side and also most proximate to outer layer portion 22a on first lateral surface side (void area of $18_1$ in FIG. 7). Further, c2 is a void area in dielectric layer 14 between first inner electrode layer 16a and second inner electrode layer 16b in the visual field most proximate to outer layer portion 20a on first main surface side and also most proximate to outer layer portion 22b on second lateral surface side (void area of $18_2$ in FIG. 7). Also, c3 is a void area in dielectric layer 14 between first inner electrode layer 16a and second inner electrode layer 16b in the visual field at the position of about ½W between the visual fields described above in multilayer ceramic capacitor 10B (void area of $18_3$ in FIG. 7).

Similarly, c4 is a void area in dielectric layer 14 between first inner electrode layer 16a and second inner electrode layer 16b in the visual field most proximate to outer layer portion 20b on second main surface side and also most proximate to outer layer portion 22a on first lateral surface side (void area of $18_4$ in FIG. 7). Similarly, c5 is a void area in dielectric layer 14 between first inner electrode layer 16a and second inner electrode layer 16b in the visual field most proximate to outer layer portion 20b on second main surface side and also most proximate to outer layer portion 22b on second lateral surface side (void area of $18_5$ in FIG. 7). Similarly, c6 is a void area in dielectric layer 14 between first inner electrode layer 16a and second inner electrode layer 16b in the visual field at the position of about ½W between the visual fields described above in multilayer ceramic capacitor 10B (void area of $18_6$ in FIG. 7).

Similarly, c7 is a void area in dielectric layer 14 between first inner electrode layer 16a and second inner electrode layer 16b in the visual field most proximate to outer layer portion 22a on first lateral surface side in dielectric layer 14 at the position of about ½T between outer layer portion 20a on first main surface side and outer layer portion 20b on second main surface side in multilayer ceramic capacitor 10B (area of $18_7$ in FIG. 7). Similarly, c8 is the area of dielectric layer 14 between first inner electrode layer 16a and second inner electrode layer 16b in the visual field most proximate to outer layer portion 22b on second lateral surface side in dielectric layer 14 at the position of about ½T between outer layer portion 20a on first main surface side and outer layer portion 20b on second main surface side in multilayer ceramic capacitor 10B (void area of $18_8$ in FIG. 7). Similarly, c9 is a void area in dielectric layer 14 between first inner electrode layer 16a and second inner electrode layer 16b in the visual field at the position of about ½W between the visual fields described above in multilayer ceramic capacitor 10B (void area of $18_9$ in FIG. 7).

The void areas of c1 to c9 are calculated by the binary analysis using the image analysis software (WinROOF).

Third void ratio C may be calculated from the ratio of the total void area cn relative to the total area of the observed visual fields Cn in dielectric layers 14 between first inner electrode layers 16a and second inner electrode layers 16b. In the present preferred embodiment, the values of third void ratio C for C1, C2, C3, C4, C5, C6, C7, C8 and C9 are averaged, and an average value thus obtained is used as third void ratio C of the whole dielectric layers 14 in portions between first inner electrode layers 16a and second inner electrode layers 16b.

The Vickers hardness in dielectric layer 14 between first inner electrode layer 16a and second inner electrode layers 16b may preferably be, for example, greater than or equal to about 850 HV and less than or equal to about 1000 HV. This may favorably increase the density of dielectric layer 14 between first inner electrode layer 16a and second inner electrode layers 16b, resulting in improved strength. The inverse piezoelectric effect of dielectric layers 14 may be produced when an electric field is applied to multilayer ceramic capacitor 10B. This may possibly cause the elastic motion of inner layer portion 18, increasing the risk of cracks. Yet, the advantageous effects described above may successfully prevent cracks, if generated, from further spreading to dielectric layers 14.

The method of measuring the Vickers hardness in dielectric layers 14 between first inner electrode layers 16a and second inner electrode layers 16b starts with exposing a surface in a cross section of multilayer ceramic capacitor 10B. To be more specific, until the position of about ½L in multilayer ceramic capacitor 10B is reached, this capacitor is polished to be parallel or substantially parallel to first end surface 12e or second end surface 12f, so that the WT cross section is exposed. In dielectric layers 14 between first inner electrode layers 16a and second inner electrode layers 16b in the exposed WT cross section, an indenter is hit into each sample surface with a micro-hardness tester at the following positions: positions most proximate to outer layer portion 22a on first lateral surface side ($18_1$, $18_4$, $18_7$ in FIG. 7), positions most proximate to outer layer portion 22b on second lateral surface side ($18_2$, $18_5$, $18_8$ in FIG. 7), and positions of about ½W in multilayer ceramic capacitor 10B between the positions described above ($18_3$, $18_6$, $18_9$ in FIG. 7). In the present preferred embodiment, the conditions used are; the indenter is a diamond pyramid indenter, load F to be applied is, for example, about 245.2 mN, and duration of the test force is about five seconds. Then, lengths d1 and d2 of diagonal lines of each indentation formed on the sample surface by the indenter are measured with lenses having about 400-times magnifying power (ocular lens: ×10, objective lens: ×40). Then, the Vickers hardness HV is measured from the following formula:

$$HV=0.1891 \times F/d^2 \, d=(d1+d2)/2.$$

Ratio A of the total area of first voids 40 relative to ratio B of the total area of second voids 42 may preferably be, for example, less than or equal to about 0.4 times, and ratio A of the total area of first voids 40 relative to ratio C of the total area of third voids 44 may preferably be, for example, less than or equal to about 1.0 times. Thus, outer layer portion 22a on first lateral surface side and outer layer portion 22b on second lateral surface side may both have increased strength to the maximum extent, and the magnitude of tensile stress may be reduced in both of outer layer portion 20a on first main surface side and outer layer portion 20b on second main surface side. The inverse piezoelectric effect of dielectric layers 14 may be produced when an electric field is applied to multilayer ceramic capacitor 10B. This may possibly cause the elastic motion of inner layer portion 18, increasing the risk of cracks in multilayer body 12B. Yet, the advantageous effects described above may successfully prevent cracks, if generated, from further spreading to dielectric layers 14 between first inner electrode layers 16a and second inner electrode layers 16b.

Ratio A of the total area of first voids 40 relative to ratio B of the total area of second voids 42 may be calculated, based on the values calculated above, by the following formula: [ratio A of first void total area/ratio B of second void total area].

Ratio A of the total area of first voids 40 relative to ratio C of the total area of third voids 44 may be calculated, based on the values calculated above, by the following formula: [ratio A of first void total area/ratio C of third void total area].

2. Production Method for Multilayer Ceramic Capacitor

A non-limiting example of a production method for multilayer ceramic capacitor 10, 10A, 10B is hereinafter described.

The ratio of first voids, 40, second voids 42, third voids 44 in multilayer ceramic capacitor 10, 10A, 10B may be controllable by adjusting the addition of NiO to a dielectric sheet defining dielectric layer 14 and/or by regulating the rate of temperature increase. The Vickers hardness may be controllable by the amount of voids included in the baked multilayer body.

First, dielectric sheets and an electrically conductive paste for inner electrode are prepared. The dielectric sheets and the electrically conductive paste for inner electrode include a binder(s) and a solvent(s). The binder(s) and the solvent(s) may be selected from the known materials. NiO, for example, is added to the dielectric sheet for outer layer portion 20a on first main surface side, dielectric sheet for outer layer portion 20b on second main surface side, dielectric sheet for outer layer portion 22a on first lateral surface side, dielectric sheet for outer layer portion 22b on second lateral surface side, and dielectric sheet for dielectric layer 14 between first inner electrode layer 16a and second inner electrode layer 16b. The growth of grains in dielectric layer 14 may be controllable by adjusting the ratio of NiO addition. The amount of voids in dielectric layer 14, therefore, may be controllable by thus controlling the growth of grains. Thus, voids may be provided, with the ratios of voids being controlled, in outer layer portion 20a on first main surface side, outer layer portion 20b on second main surface side, outer layer portion 22a on first lateral surface side, outer layer portion 22b on second lateral surface side, and dielectric layers 14 between first inner electrode layer 16a and second inner electrode layer 16b.

Next, the following dielectric sheets are prepared: dielectric sheets with no inner electrode pattern printed thereon, dielectric sheets with a first inner electrode pattern printed thereon, and dielectric sheets with a second inner electrode pattern printed thereon. To obtain these electrode pattern-printed dielectric sheets, an electrically conductive paste for inner electrode is printed on the sheets in a predetermined pattern by, for example, screen printing or gravure printing. The dielectric sheets with no inner electrode pattern printed thereon and dielectric sheets with the inner electrode patterns printed thereon respectively having different NiO addition ratios may be combined and used then.

A predetermined number of dielectric sheets with no inner electrode pattern printed thereon are prepared, and these sheets are laminated on one another to form a portion defining outer layer portion 20a on first main surface side. Further, dielectric sheets each including a first inner electrode pattern printed thereon and dielectric sheets each including a second inner electrode pattern printed thereon are prepared, and these sheets are alternately laminated on each other to form a portion defining inner layer portion 18. Further, a plurality of dielectric sheets with no inner electrode pattern printed on a portion constituting inner layer portion 18 are prepared, and these sheets are laminated on one another to form a portion defining outer layer portion 20b on second main surface side. Now, a multilayer sheet is produced and ready to be used.

Next, the produced multilayer sheet is pressed in the direction of layer lamination by, for example, isostatic pressing to produce a multilayer block.

Then, the multilayer block is cut in a predetermined size into multilayer chips. The corners and ridge portions of the multilayer chips thus obtained may be rounded by, for example, barrel finishing.

Next, the multilayer chips are baked to produce multilayer body 12. The baking temperature may preferably be, for example, higher than or equal to about 900° C. and lower than or equal to about 1400° C., although the temperature may be variable depending on materials of dielectric layer 14 and inner electrode layer 16. In outer layer portion 20a on first main surface side, outer layer portion 20b on second main surface side, outer layer portion 22a on first lateral surface side, outer layer portion 22b on second lateral surface side, and dielectric layers 14 between first inner electrode layers 16a and second inner electrode layers 16b, the amount of voids may be changed by, for example, controlling the growth of grains in dielectric layers 14 through adjustment of the rate of temperature increase during the baking of the multilayer body. The Vickers hardness may be controllable by adjusting the amount of voids included in the baked multilayer body.

Length G of outer layer portion 20a on first main surface side or outer layer portion 20b on second main surface side in direction of layer lamination x may be selected based on the following factors: total number of the laminated dielectric sheets with no inner electrode pattern printed thereon, and coefficient of contraction of the baked multilayer body.

Length T in direction of layer lamination x that connects first main surface 12a and second main surface 12b of multilayer body 12 may be selected based on the following factors: thicknesses of outer layer portion 20a on first main surface side and of outer layer portion 20b on second main surface side, total number of dielectric sheets respectively having the first inner electrode pattern and second inner electrode pattern printed thereon, and coefficient of contraction of the baked multilayer body.

Width W in direction of width y that connects first lateral surface 12c and second lateral surface 12d of multilayer body 12 and width g in direction of width y of outer layer portion 22a on first lateral surface side or outer layer portion 22b on second lateral surface side may be selected based on the following factors: dimensions of the first inner electrode pattern and second inner electrode pattern, sizes of cut pieces of the multilayer block, and coefficient of contraction of the baked multilayer body.

Next, an electrically conductive paste, which defines base electrode layer 32, is applied to first end surface 12e and second end surface 12f of multilayer body 12 to form base electrode layer 32. In the present preferred embodiment, the baked layer is formed as base electrode layer 32. To form the baked layer, base electrode layer 32, an electrically conductive paste containing a glass component and a metal(s) is applied to the target surface by, for example, dipping and then baked. The baking temperature used may preferably be, for example, higher than or equal to about 700° C. and lower than or equal to about 900° C.

When an electrically conductive resin layer is formed as base electrode layer 32, the following method of formation may be used. The electrically conductive resin layer may be formed on the baked layer, or the electrically conductive resin layer alone may be directly formed on the multilayer body without the baked layer interposed therebetween.

To form the electrically conductive resin layer, a thermosetting resin and an electrically conductive resin layer including metallic components are applied onto the baked layer or multilayer body. Then, the thermosetting resin is thermally cured under a thermal treatment at a temperature between, for example, about 250° C. and about 550° C. The thermal treatment then may preferably be performed in, for example, an $N_2$ atmosphere. Further, the concentration of oxygen then may preferably be maintained at, for example, about 100 ppm or less to prevent the thermosetting resin from splashing around and avoid oxidation of the metallic components.

When base electrode layer 32 is a thin film layer, base electrode layer 32 may be formed by a technique conventionally used for thin film formation, for example, sputtering or vapor deposition. Base electrode layer 32 in the form of a thin film may be a layer having a thickness, for example, less than or equal to about 1 μm in which metallic particles are deposited.

Optionally, plating layer 34 may be formed on an exposed portion of inner electrode layer 16 of multilayer body 12 instead of base electrode layer 32. In this instance, the following method of formation may be used.

First end surface 12e and second end surface 12f of multilayer body 12 are subjected to a plating treatment to form a ground plating layer on the exposed portion of inner electrode layer 16. The plating treatment may be either one of electrolytic plating or electroless plating. The electroless plating may involve a more complex process, because a catalyst-used pretreatment, for example, may be required to improve the rate of deposition. Therefore, electrolytic plating may preferably be used. A preferable example of the plating technique may be barrel plating. An upper plating electrode may be formed on a lower plating electrode, if necessary.

Then, plating layer 34 is formed on the surfaces of base electrode layer 32 and of the electrically conductive resin layer or is formed on the surfaces of the lower and upper plating layers. The present preferred embodiment described the formation of the Ni plating layer and Sn plating layer on the baked layer. The Ni plating layer and Sn plating layer may be sequentially formed by, for example, barrel plating.

Thus, multilayer ceramic capacitor 10, 10A, 10B is produced.

3. Test Examples

According to the method of production described above, samples of the multilayer ceramic capacitor were produced to measure and check the electrostatic capacitance and the rate of occurrence of cracks.

(A) Multilayer Ceramic Capacitors used in Working Examples and Comparative Examples
   (1) Dimensions of multilayer ceramic capacitor: $L_M \times W_M \times T_M$=about 2.1 mm x about 1.3 mm x about 1.3 mm
   (2) Dimensions of multilayer body of multilayer ceramic capacitor: L×W×T=about 2.1 mm×about 1.3 mm×about 1.3 mm
   (3) Ceramic materials of dielectric layer: $BaTiO_3$
   (4) Inner electrode layer: Ni
   (5) Electrostatic capacitance: about 1 pF
   (6) Rated voltage: about 50V
   (7) External electrode structure
   (a) Base electrode layer: Baked layer including electrically conductive metal (Cu) and glass component
     Film thickness of each end surface: about 60 μm
   (b) Plating Layer: Two layers; Ni plating layer and Sn plating layer
     Thickness of Ni plating layer: about 3.0 μm
     Thickness of Sn plating layer: about 4.0 μm
   As for samples of working examples 1 and 9 and samples of comparative examples 1 and 2, the following was prepared according to the specs shown in Table 1 below:
     Ratio of length G in the direction of layer lamination of the outer layer portion on first main surface side or the outer layer portion on second main surface side relative to length T in the direction of layer lamination that connects the first main surface and the second main surface of the multilayer body;
     Ratio of width g in the direction of width of the outer layer portion on first lateral surface side or the outer layer portion on second lateral surface side relative to width W in the direction of width that connects the first lateral surface and the second lateral surface of the multilayer body;
     Ratio A of the total area of first voids in the outer layer portion on first lateral surface side or the outer layer portion on second lateral surface side relative to the area of the outer layer portion on first lateral surface side or the outer layer portion on second lateral surface side in a cross section of the multilayer body (WT cross section at about ½L position) (first void ratio A);
     Ratio B of the total area of second voids in the outer layer portion on first main surface side or the outer layer portion on second main surface side relative to the area of the outer layer portion on first main surface side or the outer layer portion on second main surface side in a cross section of the multilayer body (WT cross section at about ½L position) (second void ratio B); and
     Ratio C of the total area of third voids in the dielectric layers in portions between the first inner electrode layers and the second inner electrode layers relative to the area of the dielectric layers in portions between the first inner electrode layers and the second inner electrode layers in a cross section of the multilayer body (WT cross section at about ½L position) (third void ratio C).

(B) Method of Measurement at Different Positions in Multilayer Body
   (1) Method of measuring length T in the direction of layer lamination that connects the first main surface and the second main surface of the multilayer body The method of measuring length T in the direction of layer lamination that connects the first main surface and the second main surface of the multilayer body started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, length T in the direction of layer lamination that connects the first main surface and the second main surface of the multilayer body was measured with a microscope at the position of about ½W in the exposed WT cross section.

(2) Method of measuring length G in the direction of layer lamination of the outer layer portion on first main surface side or the outer layer portion on second main surface side The method of measuring length G in the direction of layer lamination of the outer layer portion on first main surface side or the outer layer portion on second main surface side started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, length G in the direction of layer lamination of the outer layer portion on first main surface side or the outer layer portion on second main surface side was measured with a microscope at the position of about ½W in the exposed WT cross section.

(3) The ratio of length G in the direction of layer lamination of the outer layer portion on first main surface side or the outer layer portion on second main surface side relative to length T in the direction of layer lamination that connects the first main surface and the second main surface of the multilayer body was calculated from G/T based on results of measurement obtained in (1) and (2) described above.

(4) Method of measuring width W in the direction of width that connects the first lateral surface and the second lateral surface of the multilayer body The method of measuring width W in the direction of width that connects the first lateral surface and the second lateral surface of the multilayer body started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, width W in the direction of width that connects the first lateral surface and the second lateral surface of the multilayer body was measured with a microscope at the position of about ½T in the exposed WT cross section.

(5) Method of measuring width g in the direction of width of the outer layer portion on first lateral surface side or outer layer portion on second lateral surface side The method of measuring width g in the direction of width of the outer layer portion on first lateral surface side or the outer layer portion on second lateral surface side started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, width g in the direction of width of the outer layer portion on first lateral surface side or the outer layer portion on second lateral surface side was measured with a microscope at the position of about ½T in the exposed WT cross section.

(6) The ratio of width g in the direction of width of the outer layer portion on first lateral surface side or the outer layer portion on second lateral surface side relative to width W in the direction of width that connects the first lateral surface and the second lateral surface of the multilayer body was calculated from g/W based on results of measurement obtained in (4) and (5) described above.

(7) Method of checking the first voids in the outer layer portion on first lateral surface side and the outer layer portion on second lateral surface side, and method of measuring ratio A of the total area of the first voids in the outer layer portion on first lateral surface side or the outer layer portion on second lateral surface side relative to the area of the outer layer portion on first lateral surface side or the outer layer portion on second lateral surface side in a cross section of the multilayer body (WT cross section at about ½L position).

The method of checking the first voids in the outer layer portion on first lateral surface side and the outer layer portion on second lateral surface side started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, the outer layer portion on first lateral surface side and the outer layer portion on second lateral surface side in the exposed WT cross section were observed with a scanning electron microscope (SEM) in the following visual fields: visual field most proximate to the outer layer portion on first main surface side (region illustrated with $22a_1$ or $22b_1$ in FIG. 7), visual field most proximate to the outer layer portion on second main surface side (region illustrated with $22a_2$ or $22b_2$ in FIG. 7), and visual field at the position of about ½T in the multilayer ceramic capacitor between the visual fields described above (region illustrated with $22a_3$ or $22b_3$ in FIG. 7). The conditions used for this observation were about 2000-times magnifying power, and acceleration voltage of about 5 kV.

Next, the SEM images thus obtained were subjected to a binary analysis using an image analysis software (WinROOF, supplied by MITANI Corporation)) to calculate first void ratio A defined as ratio of the total area of the first voids in the outer layer portion on first lateral surface side or the outer layer portion on second lateral surface side relative to the area of the outer layer portion on first lateral surface side or the outer layer portion on second lateral surface side.

First, the following visual field areas in the outer layer portion on first lateral surface side were defined: A1 is the area of a visual field most proximate to the outer layer portion on first main surface side (area of $22a_1$ in FIG. 7), A2 is the area of a visual field most proximate to the outer layer portion on second main surface side (area of $22a_2$ in FIG. 7), and A3 is the area of a visual field at the position of about ½T in the multilayer ceramic capacitor between the visual fields described above (area of $22a_3$ in FIG. 7). Further, the following visual field areas in the outer layer portion on second lateral surface side were defined: A4 is the area of a visual field most proximate to the outer layer portion on first main surface side (area of $22b_1$ in FIG. 7), A5 is the area of a visual field most proximate to the outer layer portion on second main surface side (area of $22b_2$ in FIG. 7), and A6 is the area of a visual field at the position of about ½T in the multilayer ceramic capacitor between the visual fields described above (area of $22b3$ in FIG. 7). The areas of A1 to A6 were calculated by the binary analysis using the image analysis software (WinROOF).

Of the areas thus calculated by the binary analysis using the image analysis software (WinROOF), the following void areas in the outer layer portion on first lateral surface side were defined: a1 is a void area in the visual field area most proximate to the outer layer portion on first main surface side (void area of $22a_1$ in FIG. 7), a2 is a void area in the visual field area most proximate to the outer layer portion on second main surface side (void area of $22a2$ in FIG. 7), and a3 is a void area at the position of about ½T in the multilayer ceramic capacitor between the visual field areas described above (void area of $22a3$ in FIG. 7). Further, the following void areas in the outer layer portion on second lateral surface side were defined: a4 is a void area in the visual field area most proximate to the outer layer portion on first main surface side (void area of $22b1$ in FIG. 7), a5 is a void area in the visual field area most proximate to the outer layer portion on second main surface side (void area of $22b2$ in FIG. 7), and a6 is a void area at the position of about ½T in the multilayer ceramic capacitor between the visual field areas described above (void area of $22b3$ in FIG. 7). The areas of a1 to a6 were calculated by the binary analysis using the image analysis software (WinROOF).

First void ratio A was calculated from the ratio of the total void area an relative to the total area An of the observed visual fields in the outer layer portion on first lateral surface side or the outer layer portion on second lateral surface side. In this test example, the values of first void ratio A for A1, A2, A3, A4, A5 and A6 were averaged, and an average value thus obtained was used as first void ratio A of the whole outer layer portions on the outer layer portion on first lateral surface side or the outer layer portion on second lateral surface side.

(8) Method of checking the second voids in the outer layer portion on first main surface side and in the outer layer portion on second main surface side, and method of measuring ratio B of the total area of the second voids in the outer layer portion on first main surface side or the outer layer portion on second main surface side relative to the area of the outer layer portion on first main surface side or the outer layer portion on second main surface side in a cross section of the multilayer body (WT cross section at about ½L position).

The method of checking the second voids in the outer layer portion on first main surface side and in the outer layer portion on second main surface side started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, the outer layer portion on first main surface side and the outer layer portion on second main surface side in the exposed WT cross section were observed with a scanning electron microscope (SEM) in the following visual fields: visual field most proximate to the outer layer portion on first lateral surface side (region illustrated with $20a_1$ or $20b_1$ in FIG. 7), visual field most proximate to the outer layer portion on second lateral surface side (region illustrated with $20a_2$ or $20b_2$ in FIG. 7), and visual field at the position of about ½W in the multilayer ceramic capacitor between the visual fields described above (region illustrated with $20a_3$ or $20b_3$ in FIG. 7). The conditions used in this test example were about 2000-times magnifying power, and acceleration voltage of about 5 kV.

The SEM images thus obtained were subjected to a binary analysis using an image analysis software (WinROOF, supplied by MITANI Corporation) to calculate second void ratio B defined as ratio of the total area of the second voids in the outer layer portion on first main surface side or the outer layer portion on second main surface side relative to the area of the outer layer portion on first main surface side or the outer layer portion on second main surface side.

First, the following visual field areas in the outer layer portion on first main surface side were defined: B1 is the area of a visual field most proximate to the outer layer portion on first lateral surface side (area of $20a_1$ in FIG. 7), B2 is the area of a visual field most proximate to the outer layer portion on second lateral surface side (area of $20a_2$ in FIG. 7), and B3 is the area of a visual field at the position of about ½W in the multilayer ceramic capacitor between the visual fields described above (area of $20a_3$ in FIG. 7). Further, the following visual field areas in the outer layer portion on second main surface side were defined: B4 is the area of a visual field most proximate to the outer layer portion on first lateral surface side (area of $20b_1$ in FIG. 7), B5 is the area of a visual field most proximate to the outer layer portion on second lateral surface side (area of $20b_2$ in FIG. 7), and B6 is the area of a visual field at the position of about ½W in the multilayer ceramic capacitor between the visual fields described above (area of $20b_3$ in FIG. 7). The areas of B1 to B6 were calculated by the binary analysis using the image analysis software (WinROOF).

Of the areas thus calculated by the binary analysis using the image analysis software (WinROOF), the following void areas in the outer layer portion on first main surface side were defined: b1 is a void area in the visual field area most proximate to the outer layer portion on first lateral surface side (void area of $20a_1$ in FIG. 7), b2 is a void area in the visual field area most proximate to the outer layer portion on second lateral surface side (void area of $20a_2$ in FIG. 7), and b3 is a void area at the position of about ½W in the multilayer ceramic capacitor between the visual field areas described above (void area of $20a3$ in FIG. 7). Further, the following void areas in the outer layer portion on second main surface side were defined: b4 is a void area in the visual field area most proximate to the outer layer portion on first lateral surface side (void area of $20b_1$ in FIG. 7), b5 is a void area in the visual field area most proximate to the outer layer portion on second lateral surface side (void area of $20b_2$ in FIG. 7), and b6 is a void area at the position of about ½W in the multilayer ceramic capacitor between the visual field areas described above (void area of $20b3$ in FIG. 7). The areas of b1 to b6 were calculated by the binary analysis using the image analysis software (WinROOF).

Second void ratio B was calculated from the ratio of the total void area bn relative to the total area Bn of the observed visual fields in the outer layer portion on first main surface side and the outer layer portion on second main surface side. In this test example, the values of second void ratio B for B1, B2, B3, B4, B5 and B6 were averaged, and an average value thus obtained was used as second void ratio B of the whole outer layer portions $20a$ and $20b$ on first and second main surface sides.

Below are an example of a method of checking the third voids in the dielectric layers between the first inner electrode layers and the second inner electrode layers, and an example of a method of calculating third void ratio C of the total area of the third voids in the dielectric layers in portions between the first inner electrode layers and the second inner electrode layers relative to the area of the dielectric layers in portions between the first inner electrode layers and the second inner electrode layers in a cross section of the multilayer body (WT cross section at about ½L position).

The method of checking third voids in the dielectric layers between the first inner electrode layers and the second inner electrode layers started with exposing a surface in a cross section of the multilayer ceramic capacitor. To be more specific, until the position of about ½L in the multilayer ceramic capacitor was reached, this capacitor was polished to be parallel or substantially parallel to the first end surface or the second end surface, so that the WT cross section was exposed. Then, the following dielectric layers between the first inner electrode layers and the second inner electrode layers in the exposed WT cross section were observed with a scanning electron microscope (SEM): dielectric layer most proximate to the outer layer portion on first main surface side ($18_1$, $18_2$, $18_3$ in FIG. 7), dielectric layer most proximate to the outer layer portion on second main surface side ($18_4$, $18_5$, $18_6$ in FIG. 7), and dielectric layer at the about ½T position in the multilayer ceramic capacitor between the dielectric layers described above ($18_7$, $18_8$, $18_9$ in FIG. 7). The conditions used for this observation were about 2000-times magnifying power, and acceleration voltage of about 5 kV.

The SEM images thus obtained were subjected to a binary analysis using an image analysis software (WinROOF) to calculate third void ratio C.

First, C1 is the area of the dielectric layer between the first inner electrode layer and the second inner electrode layer in a visual field most proximate to the outer layer portion on first main surface side and also most proximate to the outer layer portion on first lateral surface side (area of $18_1$ in FIG. 7). Further, C2 is the area of the dielectric layer between the first inner electrode layer and the second inner electrode layer in a visual field most proximate to the outer layer portion on first main surface side and also most proximate to the outer layer portion on second lateral surface side (area of $18_2$ in FIG. 7). Also, C3 is the area of the dielectric layer between the first inner electrode layer and the second inner electrode layer in a visual field at the position of about ½W between the visual fields described above in the multilayer ceramic capacitor (area of $18_3$ in FIG. 7).

Similarly, C4 is the area of the dielectric layer between the first inner electrode layer and the second inner electrode layer in a visual field most proximate to the outer layer portion on second main surface side and also most proximate to the outer layer portion on first lateral surface side (area of $18_4$ in FIG. 7). Similarly, C5 is the area of the dielectric layer between the first inner electrode layer and the second inner electrode layer in a visual field most proximate to the outer layer portion on second main surface side and also most proximate to the outer layer portion on second lateral surface side (area of $18_5$ in FIG. 7). Similarly, C6 is the area of the dielectric layer between the first inner electrode layer and the second inner electrode layer in a visual field at the position of about ½W between the visual fields described above in the multilayer ceramic capacitor (area of $18_6$ in FIG. 7).

Similarly, C7 is the area of the dielectric layer between the first inner electrode layer and the second inner electrode layer in a visual field most proximate to the outer layer portion on first lateral surface side at the position of about ½T between the outer layer portion on first main surface side and the outer layer portion on second main surface side in the multilayer ceramic capacitor (area of $18_7$ in FIG. 7). Similarly, C8 is the area of the dielectric layer between the first inner electrode layer and the second inner electrode layer in a visual field most proximate to the outer layer portion on second lateral surface side at the position of about ½T between the outer layer portion on first main surface side and the outer layer portion on second main surface side in the multilayer ceramic capacitor (area of $18_8$ in FIG. 7). Similarly, C9 is the area of the dielectric layer between the first inner electrode layer and the second inner electrode layer in a visual field at the position of about ½W between the visual fields described above in the multilayer ceramic capacitor (area of 18₉ in FIG. 7).

The void areas of C1 to C9 were calculated by the binary analysis using the image analysis software (WinROOF).

Of the areas thus calculated by the binary analysis using the image analysis software (WinROOF), c1 is a void area in the dielectric layer between the first inner electrode layer and the second inner electrode layer in the visual field most proximate to the outer layer portion on first main surface side and also most proximate to the outer layer portion on first lateral surface side (void area of 18₁ in FIG. 7). Further, c2 is a void area in the dielectric layer between the first inner electrode layer and the second inner electrode layer in the visual field most proximate to the outer layer portion on first main surface side and also most proximate to the outer layer portion on second lateral surface side (void area of 18₂ in FIG. 7). Also, c3 is a void area in the dielectric layer between the first inner electrode layer and the second inner electrode layer in the visual field at the position of about ½W between the visual fields described above in the multilayer ceramic capacitor (area of 18₃ in FIG. 7).

Similarly, c4 is a void area in the dielectric layer between the first inner electrode layer and the second inner electrode layer in the visual field most proximate to the outer layer portion on second main surface side and also most proximate to the outer layer portion on first lateral surface side (void area of 18₄ in FIG. 7). Similarly, c5 is a void area in the dielectric layer between the first inner electrode layer and the second inner electrode layer in the visual field most proximate to the outer layer portion on second main surface side and also most proximate to the outer layer portion on second lateral surface side (void area of 18₆ in FIG. 7). Similarly, c6 is a void area in the dielectric layer between the first inner electrode layer and the second inner electrode layer in the visual field at the position of about ½W between the visual fields described above in the multilayer ceramic capacitor (area of 18₆ in FIG. 7).

Similarly, c7 is a void area in the dielectric layer between the first inner electrode layer and the second inner electrode layer in the visual field most proximate to the outer layer portion on first lateral surface side at the position of about ½T between the outer layer portion on first main surface side and the outer layer portion on second main surface side in the multilayer ceramic capacitor (area of 18₇ in FIG. 7). Similarly, c8 is a void area in the dielectric layer between the first inner electrode layer and the second inner electrode layer in the visual field most proximate to the outer layer portion on second lateral surface side at the position of about ½T between the outer layer portion on first main surface side and the outer layer portion on second main surface side in the multilayer ceramic capacitor (area of 18₈ in FIG. 7). Similarly, c9 is a void area in the dielectric layer between the first inner electrode layer and the second inner electrode layer in the visual field at the position of about ½W between the visual fields described above in the multilayer ceramic capacitor (area of 18₉ in FIG. 7).

The void areas of c1 to c9 were calculated by the binary analysis using the image analysis software (WinROOF).

Third void ratio C may be calculated from the ratio of the total void area cn relative to the total area of the observed visual fields Cn in the dielectric layers between the first inner electrode layers and the second inner electrode layers. In this test example, the values of third void ratio C for C1, C2, C3, C4, C5, C6, C7, C8 and C9 were averaged, and an average value thus obtained was used as third void ratio C of the whole dielectric layers 14 in portions between the first inner electrode layers 16a and the second inner electrode layers 16b.

The electrostatic capacitance was measured and the rate of occurrence of cracks was checked by the following methods.

Electrostatic Capacitance Measurement

A meter (supplied by Agilent Technologies Inc., model number 4278A) was used to measure the electrostatic capacitance (C) obtainable under the condition of about 1 kHz and about 1.0 Vrms.

Table 1 below shows the result of this electrostatic capacitance measurement for 10 samples of each capacitor to be tested. Any values of the electrostatic capacitance greater than about 1.10 pF were rated as inferior.

Method of Checking the Rate of Occurrence of Cracks Through Electrostriction Testing The electrostriction of the multilayer ceramic capacitor was tested with a B.D.V. device. Specific test conditions were pressure increase to about DC150 V, and rate of temperature increase of about 100 V/sec.

After the electrostriction was tested, whether the multilayer ceramic capacitor had any crack was observed with an ultrasonic flaw detector. Specifically, the multilayer ceramic capacitors, samples to be tested, were aligned such that the direction of layer lamination of the inner electrode layers was directed upward. The upper surfaces of the aligned multilayer ceramic capacitors were irradiated with ultrasonic wave for scanning with an ultrasonic probe. The reflected ultrasonic wave was used to observe whether any wave reflected sooner than the bottom face wave was detectable and thereby determine whether any cracks are present. Any sample determined as having a crack(s) was rated as having an electrostriction-related poor quality. Then, the rate of occurrence of cracks was calculated.

Table 1 shows the result of the rate of occurrence of cracks for 100 samples of each capacitor to be tested. Any samples with the rate of occurrence of cracks greater than about 10% were rated as inferior.

TABLE 1

|  | G/T: ratio of outer layer to dimension "T" | g/W: ratio of Wgap to dimension "W" | A: void ratio in outer layer portion on lateral surface side | B: void ratio in outer layer portion on main surface side | C: void ratio in dielectric element | Rate of occurrence of cracks under electrostriction at 150 V | Electrostatic capacitance (μF) |
|---|---|---|---|---|---|---|---|
| Comparative Example 1 | 0.023 | 0.016 | 0.01 | 0.58 | 0.50 | 70% | 1.70 |
| Working Example 1 | 0.040 | 0.050 | 0.02 | 0.40 | 0.15 | 10% | 1.10 |
| Working Example 2 | 0.074 | 0.050 | 0.02 | 0.40 | 0.15 | 7% | 1.03 |

TABLE 1-continued

|  | G/T: ratio of outer layer to dimension "T" | g/W: ratio of Wgap to dimension "W" | A: void ratio in outer layer portion on lateral surface side | B: void ratio in outer layer portion on main surface side | C: void ratio in dielectric element | Rate of occurrence of cracks under electrostriction at 150 V | Electrostatic capacitance (μF) |
|---|---|---|---|---|---|---|---|
| Working Example 3 | 0.074 | 0.050 | 0.20 | 0.50 | 0.20 | 5% | 1.01 |
| Working Example 4 | 0.074 | 0.050 | 0.20 | 0.58 | 0.50 | 0% | 1.02 |
| Working Example 5 | 0.074 | 0.050 | 0.20 | 0.58 | 0.80 | 0% | 1.03 |
| Working Example 6 | 0.074 | 0.050 | 0.20 | 0.58 | 1.00 | 0% | 1.03 |
| Working Example 7 | 0.074 | 0.050 | 0.20 | 0.70 | 1.00 | 3% | 1.01 |
| Working Example 8 | 0.074 | 0.050 | 0.20 | 0.40 | 1.00 | 5% | 1.01 |
| Working Example 9 | 0.100 | 0.020 | 0.20 | 0.40 | 1.00 | 2% | 0.97 |
| Comparative Example 2 | 0.123 | 0.069 | 0.26 | 0.58 | 0.50 | 23% | 1.14 |

As shown in Table 1, the comparison of the working examples with the comparative examples shows that the rate of occurrence of cracks was controlled well and an abundant electrostatic capacitance was obtainable, insofar as the following conditions were satisfied:
the ratio of length G in the direction of layer lamination of the outer layer portion on first main surface side or the outer layer portion on second main surface side relative to length T in the direction of layer lamination that connects the first main surface and the second main surface of the multilayer body is greater than or equal to about 0.04 and less than or equal to about 0.10;
the ratio of width g in the direction of width of the outer layer portion on first lateral surface side or the outer layer portion on second lateral surface side relative to width W in the direction of width that connects the first lateral surface and the second lateral surface of the multilayer body is greater than or equal to about 0.02 and less than or equal to about 0.05;
there are a plurality of first voids in the outer layer portion on first lateral surface side and the outer layer portion on second lateral surface side; and
ratio A of the total area of the first voids in the outer layer portion on first lateral surface side or the outer layer portion on second lateral surface side relative to the area of the outer layer portion on first lateral surface side or the outer layer portion on second lateral surface side of the multilayer body is greater than or equal to about 0.02% and less than or equal to about 0.2%.

Further, it was confirmed that the rate of occurrence of cracks was even better controllable and an abundant electrostatic capacitance was obtainable, insofar as the following conditions are satisfied:
there are a plurality of second voids in the outer layer portion on first main surface side and the outer layer portion on second main surface side; and
ratio B of the total area of the second voids in the outer layer portion on first main surface side or the outer layer portion on second main surface side relative to the area of the outer layer portion on first main surface side or the outer layer portion on second main surface side in the WT cross section at the about ½L position in the multilayer body is greater than or equal to about 0.5% and less than or equal to about 0.7% (working examples 3 to 7).

Also, it was confirmed that that the rate of occurrence of cracks was effectively controllable and an abundant electrostatic capacitance was obtainable, insofar as the following conditions are satisfied:
there are a plurality of third voids in the dielectric layers between the first inner electrode layers and the second inner electrode layers; and
ratio C of the total area of the third voids in the dielectric layers in portions between the first inner electrode layers and the second inner electrode layers relative to the area of the dielectric layers in portions between the first inner electrode layers and the second inner electrode layers in the WT cross section at the about ½L position of the multilayer body is greater than or equal to about 0.2% and less than or equal to about 0.8% (working examples 4 to 6).

These results indicate that the ratio of length G in direction of layer lamination x of outer layer portion 20a on first main surface side or outer layer portion 20b on second main surface side relative to length T in direction of layer lamination x that connects first main surface 12a and second main surface 12b of multilayer body 12, 12A, 12B in multilayer ceramic capacitor 10, 10A, 10B disclosed herein is greater than or equal to about 0.04 and less than or equal to about 0.10. Then, an adequate thickness may be secured for outer layer portion 20a on first main surface side or the outer layer portion 20b on second main surface side that are connected to outer layer portion 22a on first lateral surface side and the outer layer portion 22b on second lateral surface side. Incidentally, the inverse piezoelectric effect of dielectric layers 14 may be produced when an electric field is applied to multilayer ceramic capacitor 10 10A, 10B, which possibly causes the elastic motion of inner layer portion 18. Such an outer layer portion with an adequate thickness, however, may provide an inverse piezoelectric-free area (i.e., outer layer portion 20a on first main surface side and outer layer portion 20b on second main surface side). This may reduce the risk of cracks induced by the possible elastic motion of inner layer portion 18 under the inverse piezoelectric effect of dielectric layers 14. In addition to these favorable results, it also became evident that the range of values suggested above may secure an abundant electrostatic capacitance of multilayer ceramic capacitor 10, 10A, 10B.

In multilayer ceramic capacitor 10, 10A, 10B W, the ratio of width g in direction of width y of outer layer portion 22a on first lateral surface side or outer layer portion 22b on second lateral surface side relative to width W in direction of width y that connects first lateral surface 12c and second lateral surface 12d of multilayer body 12, 12A, 12B may be, example, greater than or equal to about 0.02 and less than or equal to about 0.05. Then, an adequate thickness may be secured for outer layer portion 22a on first lateral surface side or outer layer portion 22b on second lateral surface side that are connected to outer layer portion 20a on first main surface side or outer layer portion 20b on second main surface side. Incidentally, the inverse piezoelectric effect of dielectric layers 14 may be produced when an electric field is applied to multilayer ceramic capacitor 10, 10A, 10B, which possibly causes the elastic motion of inner layer portion 18. Such an outer layer portion with an adequate thickness, however, may provide an inverse piezoelectric-free area (i.e., outer layer portion 20a on first main surface side, outer layer portion 20b on second main surface side, outer layer portion 22a on first lateral surface side, and outer layer portion 22b on second lateral surface side). This may reduce the risk of cracks induced by the possible elastic motion of inner layer portion 18 under the inverse piezoelectric effect of dielectric layers 14. In addition to these favorable results, it also became evident that the range of values described above may secure an abundant electrostatic capacitance of the multilayer ceramic capacitor.

In multilayer ceramic capacitor 10, 10A, 10B disclosed herein, there are a plurality of first voids 40 in outer layer portion 22a on first lateral surface side and outer layer portion 22b on second lateral surface side, and ratio A of the total area of first voids 40 in outer layer portion 22a on first lateral surface side or outer layer portion 22b on second lateral surface side relative to the area of outer layer portion 22a on first lateral surface side or outer layer portion 22b on second lateral surface side in a cross section of multilayer body 12, 12A, 12B (WT cross section at ½L position) may be, for example, greater than or equal to about 0.02% and less than or equal to about 0.2%. This may allow first voids 40 to effectively reduce or prevent any inverse piezoelectric-induced stress, while achieving, at the same time, a higher degree of density in outer layer portion 22a on first lateral surface side and outer layer portion 22b on second lateral surface side. As a result, outer layer portion 22a on first lateral surface side and outer layer portion 22b on second lateral surface side may both have improved strength. Incidentally, the inverse piezoelectric effect of dielectric layers 14 may be produced when an electric field is applied to multilayer ceramic capacitor 10, 10A, 10B, which possibly causes the elastic motion of inner layer portion 18 and resulting cracks. Such an outer layer portion having improved density and strength, however, may successfully reduce the risk of cracks in multilayer body 12, 12A, 12B.

While the preferred embodiments of the present invention have been described, the present invention is not necessarily limited to any preferred embodiment described herein.

The preferred embodiments disclosed herein may be variously modified in terms of such factors as mechanism, shape, material, quantity, position and/or layout without departing the scope of technical ideas and purposes of this disclosure. This disclosure may naturally encompass such modifications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including:
  a plurality of dielectric layers laminated on each other;
  a plurality of inner electrode layers laminated on the plurality of dielectric layers;
  a first main surface and a second main surface opposed to each other in a direction of layer lamination;
  a first end surface and a second end surface opposed to each other in a direction of length orthogonal or substantially orthogonal to the direction of layer lamination; and
  a first lateral surface and a second lateral surface opposed to each other in a direction of width orthogonal or substantially orthogonal to the direction of layer lamination and the direction of length;
a first external electrode on the first end surface;
a second external electrode on the second end surface; wherein
the multilayer body further includes:
  an inner layer portion in which the plurality of inner electrode layers are opposed to each other;
  an outer layer portion on a first main surface side on a side closer to the first main surface and including the plurality of dielectric layers at the first main surface, a first outermost surface of the inner layer portion on the side closer to the first main surface and a line of extension from the outermost surface;
  an outer layer portion on a second main surface side on a side closer to the second main surface and including the plurality of dielectric layers at the second main surface, a second outermost surface of the inner layer portion on the side closer to the second main surface and a line of extension from the outermost surface;
  an outer layer portion on a first lateral surface side on a side closer to the first lateral surface and including the plurality of dielectric layers between the first lateral surface and an outermost surface of the inner layer portion on the side closer to the first lateral surface; and
  an outer layer portion on a second lateral surface side on a side closer to the second lateral surface and including the plurality of dielectric layers between the second lateral surface and an outermost surface of the inner layer portion on the side closer to the second lateral surface;
a ratio of a length G of the outer layer portion on the first main surface side or the outer layer portion on the second main surface side in the direction of layer lamination relative to a length T in the direction of layer lamination that connects the first main surface and the second main surface of the multilayer body is greater than or equal to about 0.04 and less than or equal to about 0.10;
a ratio of a width g of the outer layer portion on the first lateral surface side or the outer layer portion on the second lateral surface side in the direction of width relative to a width W in the direction of width that connects the first lateral surface and the second lateral surface of the multilayer body is greater than or equal to about 0.02 and less than or equal to about 0.05;
a plurality of first voids are in the outer layer portion on the first lateral surface side and in the outer layer portion on the second lateral surface side; and
a ratio A of a total area of the plurality of first voids in the outer layer portion on the first lateral surface side or in the outer layer portion on the second lateral surface side relative to an area of the outer layer portion on the first lateral surface side or the outer layer portion on the second lateral surface side in a cross section of the multilayer body is greater than or equal to about 0.02% and less than or equal to about 0.2%.

2. The multilayer ceramic capacitor according to claim 1, wherein
a plurality of second voids are in the outer layer portion on the first main surface side and in the outer layer portion on the second main surface side; and
a ratio B of a total area of the plurality of second voids in the outer layer portion on the first main surface side or in the outer layer portion on the second main surface side relative to an area of the outer layer portion on the first main surface side or the outer layer portion on the second main surface side in a cross section of the multilayer body is greater than or equal to about 0.5% and less than or equal to about 0.7%.

3. The multilayer ceramic capacitor according to claim 1, wherein
each of the plurality of inner electrode layers includes:
a first inner electrode layer extending to the first end surface; and
a second inner electrode layer extending to the second end surface;
the first inner electrode layers and the second inner electrode layers are opposed to each other with the plurality of dielectric layers interposed between the first inner electrode layers and the second inner electrode layers;
a plurality of third voids are provided in the plurality of dielectric layers between the first inner electrode layers and the second inner electrode layers; and
a ratio C of a total area of the plurality of third voids in the plurality of dielectric layers in portions between the first inner electrode layers and the second inner electrode layers relative to an area of the plurality of dielectric layers in portions between the first inner electrode layers and the second inner electrode layers in a cross section of the multilayer body is greater than or equal to about 0.2% and less than or equal to about 0.8%.

4. The multilayer ceramic capacitor according to claim 1, wherein each of the plurality of dielectric layers includes at least one of $BaTiO_3$, $CaTiO_3$, $SrTiO_3$, or $CaZrO_3$ as a main ingredient.

5. The multilayer ceramic capacitor according to claim 4, wherein each of the plurality of dielectric layers includes at least one of an Mn compound, an Fe compound, a Cr compound, a Co compound, or an Ni compound.

6. The multilayer ceramic capacitor according to claim 1, wherein a thickness of each of the plurality of dielectric layers is greater than or equal to about 0.5 μm and less than or equal to about 10 μm.

7. The multilayer ceramic capacitor according to claim 1, wherein each of the plurality of inner electrode layers includes at least one of Cu, Ag, Pd, or Au and an alloy including at least one of Cu, Ag, Pd, or Au.

8. The multilayer ceramic capacitor according to claim 1, wherein a thickness of each of the plurality of inner electrode layers is greater than or equal to about 0.2 μm and less than or equal to about 2.0 μm.

9. The multilayer ceramic capacitor according to claim 1, wherein each of the first and second external electrodes extends onto a portion of the first and second main surfaces and onto a portion of each of the first and second lateral surfaces.

10. The multilayer ceramic capacitor according to claim 1, wherein each of the first and second external electrodes includes a base electrode layer and a plating layer on the base electrode layer.

11. The multilayer ceramic capacitor according to claim 10, wherein the base electrode layer includes at least one of a baked layer, an electrically conductive resin layer, and a thin film layer.

12. The multilayer ceramic capacitor according to claim 11, wherein the baked layer includes a glass component and a metal.

13. The multilayer ceramic capacitor according to claim 12, wherein the glass component includes at least one of B, Si, Ba, Mg, Al, or Li, and the metal includes at least one of Cu, Ni, Ag, Pd, Ag—Pd alloy or Au.

14. The multilayer ceramic capacitor according to claim 10, wherein a thickness of the base electrode layer is greater than or equal to about 3 μm and less than or equal to about 160 μm.

15. The multilayer ceramic capacitor according to claim 10, wherein the plating layer includes a Ni plating layer on the base electrode layer and an Sn plating layer on the Ni plating layer.

16. The multilayer ceramic capacitor according to claim 10, wherein a thickness of the plating layer is greater than or equal to about 2 μm and less than or equal to about 15 μm.

17. The multilayer ceramic capacitor according to claim 10, wherein the plating layer includes at least one of Cu, Ni, Sn, Ag, Pd, Ag—Pd alloys, or Au.

* * * * *